United States Patent
Yamaguchi et al.

(10) Patent No.: US 11,691,553 B2
(45) Date of Patent: Jul. 4, 2023

(54) PSYCHOSOMATIC STATE ADJUSTMENT SUPPORT DEVICE, PSYCHOSOMATIC STATE ADJUSTMENT SUPPORT METHOD, AND PSYCHOSOMATIC STATE ADJUSTMENT SUPPORT PROGRAM

(71) Applicant: AISIN CORPORATION, Kariya (JP)

(72) Inventors: Hideaki Yamaguchi, Kariya (JP); Suzuka Yamaguchi, Kariya (JP); Takayuki Kodama, Otsu (JP)

(73) Assignee: AISIN CORPORATION, Kariya (JP)

( * ) Notice: Subject to any disclaimer, the term of this patent is extended or adjusted under 35 U.S.C. 154(b) by 163 days.

(21) Appl. No.: 16/688,362

(22) Filed: Nov. 19, 2019

(65) Prior Publication Data
US 2020/0156523 A1   May 21, 2020

(30) Foreign Application Priority Data
Nov. 20, 2018  (JP) .............................. JP2018-217555

(51) Int. Cl.
*A61H 23/02*   (2006.01)
*B60N 2/00*   (2006.01)
*B60N 2/90*   (2018.01)

(52) U.S. Cl.
CPC ............ *B60N 2/976* (2018.02); *A61H 23/02* (2013.01); *A61H 2023/0209* (2013.01); *A61H 2201/0149* (2013.01); *A61H 2201/5007* (2013.01); *A61H 2201/5035* (2013.01); *A61H 2201/5046* (2013.01)

(58) Field of Classification Search
CPC ............ A61H 23/02; A61H 2023/0209; A61H 2201/0149; A61H 2201/5007; A61H 2201/5035; A61H 2201/5046; B60N 2/976
See application file for complete search history.

(56) References Cited

U.S. PATENT DOCUMENTS

| | | | | |
|---|---|---|---|---|
| 2008/0119994 | A1* | 5/2008 | Kameyama | B60W 40/08 701/48 |
| 2016/0354027 | A1* | 12/2016 | Benson | A61B 1/1102 |
| 2017/0028163 | A1* | 2/2017 | Onuma | A61H 9/0078 |
| 2018/0134116 | A1* | 5/2018 | Chen | B60H 1/00764 |
| 2018/0186251 | A1* | 7/2018 | Yetukuri | B60N 2/002 |

FOREIGN PATENT DOCUMENTS

| | | |
|---|---|---|
| JP | 2008-120164 A | 5/2008 |
| JP | 5028071 B2 | 9/2012 |
| JP | 2017-154650 A | 9/2017 |

* cited by examiner

*Primary Examiner* — Timothy A Stanis
(74) *Attorney, Agent, or Firm* — Sughrue Mion, PLLC

(57) ABSTRACT

A psychosomatic state adjustment support device includes: a storage section that stores a target psychosomatic state for each destination of a moving body; a specification section that specifies a current psychosomatic state of an occupant of the moving body; an acquisition section that acquires a destination of the moving body; a deciding section that decides a vibration pattern based on the target psychosomatic state according to the destination and the current psychosomatic state; and a control section that applies a vibration stimulation to the occupant by causing a vibration applying section provided in a seat on which the occupant is seated to vibrate based on the vibration pattern.

8 Claims, 17 Drawing Sheets

FIG. 5

| TARGET | | MEANS | VIBRATION STIMULATION CONDITION | | |
|---|---|---|---|---|---|
| | | | STIMULATION PART | | VIBRATION PATTERN |
| MENTAL ACTIVITY | POSITIVE MENTAL STATE | INDUCTION OF KINESTHETIC ILLUSION OF LIGHT EXERCISE | EXTERNAL OBLIQUE MUSCLE | A | ALTERNATELY APPLY VIBRATION STIMULATIONS OF LOW FREQUENCY (40 TO 60 Hz) AND HIGH FREQUENCY (80 TO 100 Hz) AT PREDETERMINED TIME INTERVALS |
| | | | GLUTEUS MEDIUS MUSCLE AND OUTERVASTUS MUSCLE | B | |
| | | | ACHILLES TENDON AND PLANTARIS MUSCLE | C | |
| | | INDUCTION OF BREATHING TO INHALE DEEPLY | FRONT SAW MUSCLE AND LATISSIMUS DORSI MUSCLE | D | ALTERNATELY APPLY VIBRATION STIMULATION OF HIGH FREQUENCY (80 TO 100 Hz) AND STIMULATION STOP AT PREDETERMINED TIME INTERVALS |
| | RELAXED MENTAL STATE | INDUCTION OF RUBBING ILLUSION | (SHOULDER RUBBING) DELTOID MUSCLE AND TRAPEZIUS MUSCLE | E | ALTERNATELY APPLY VIBRATION STIMULATIONS OF LOW FREQUENCY (40 TO 60 Hz) AND HIGH FREQUENCY (80 TO 100 Hz) AT PREDETERMINED TIME INTERVALS |
| | | | (BACK RUBBING) DELTOID MUSCLE AND FRONT SAW MUSCLE | F | |
| | | | (BUTTOCK RUBBING) GLUTEUS MEDIUS MUSCLE | G | |
| | | INDUCTION OF BREATHING TO EXHALE DEEPLY | FRONT SAW MUSCLE AND LATISSIMUS DORSI MUSCLE | H | APPLY VIBRATION STIMULATION OF HIGH FREQUENCY (80 TO 100 Hz) WITH LOW INTENSITY FOR PREDETERMINED TIME |
| PHYSICAL ACTIVITY | NIMBLE BODY STATE | PREPARATION OF SKELETAL MUSCLE USED FOR POSTURE CONTROL | DELTOID MUSCLE | I | SEQUENTIALLY APPLY VIBRATION STIMULATION OF HIGH FREQUENCY (80 TO 100 Hz) WITH LOW INTENSITY AT PREDETERMINED TIME INTERVALS |
| | | | LATISSIMUS DORSI MUSCLE | | |
| | | | GLUTEUS MEDIUS MUSCLE | | |
| | | | OUTERVASTUS MUSCLE | | |
| | | | ACHILLES TENDON | | |

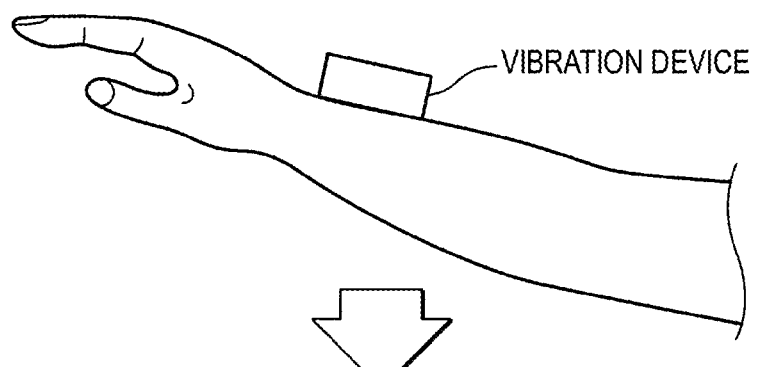
FIG.8A
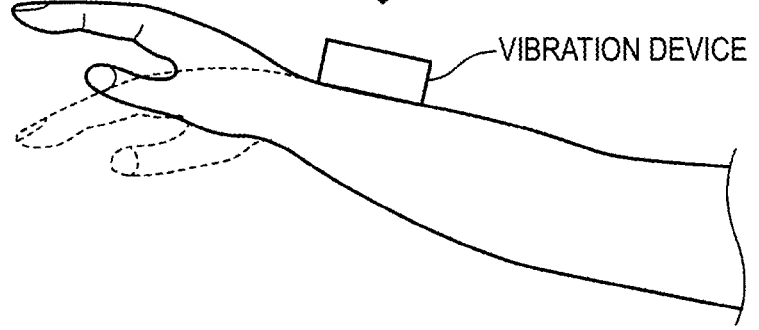
FIG.8B
FIG.9
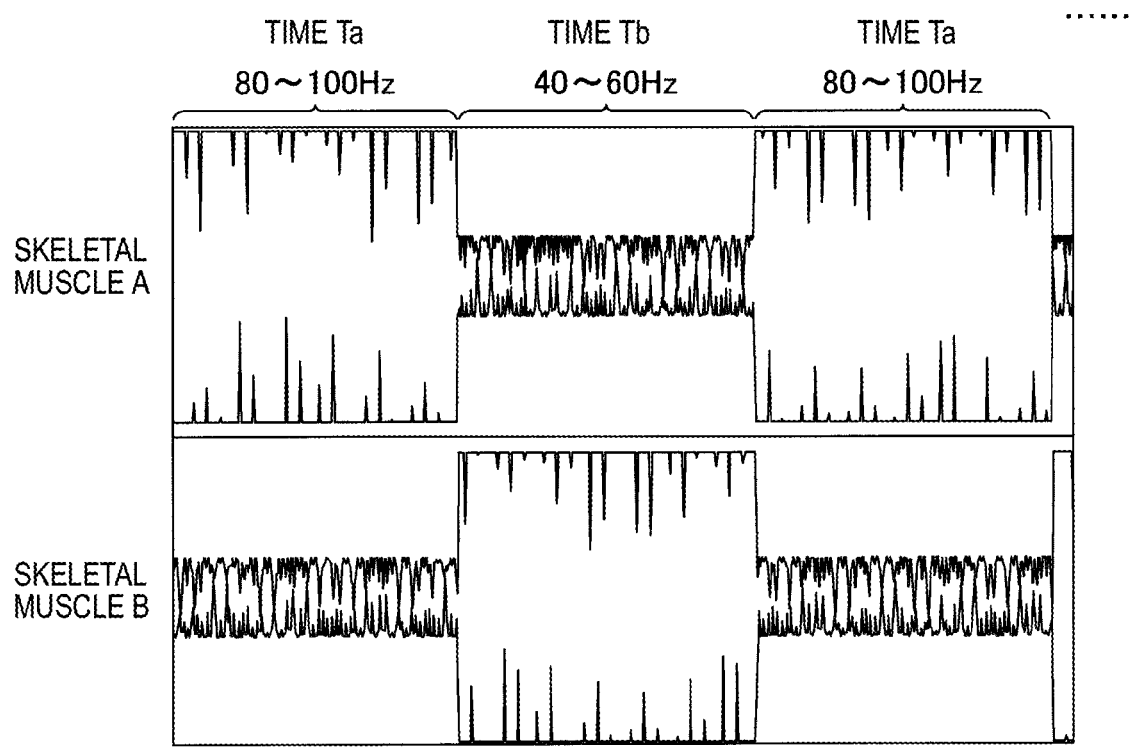

VIBRATION PATTERN A

VIBRATION PATTERN B

VIBRATION PATTERN C

VIBRATION PATTERN D    STOP VIBRATION

VIBRATION PATTERN E

VIBRATION PATTERN F

*FIG.16A*      *FIG.16B*
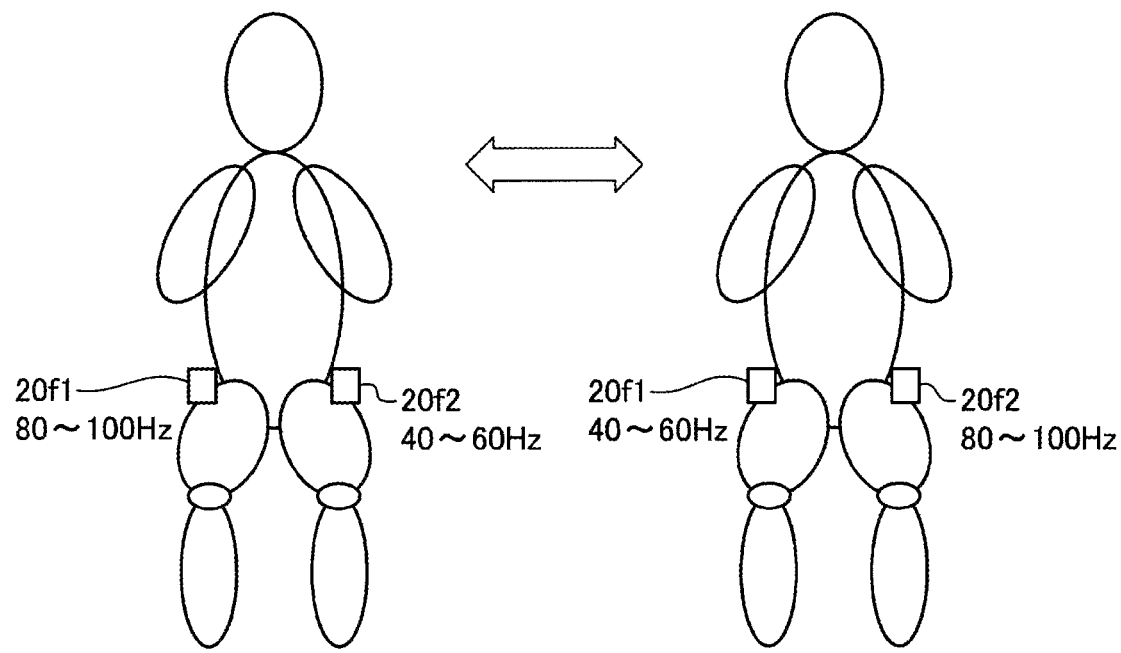
*FIG.17*
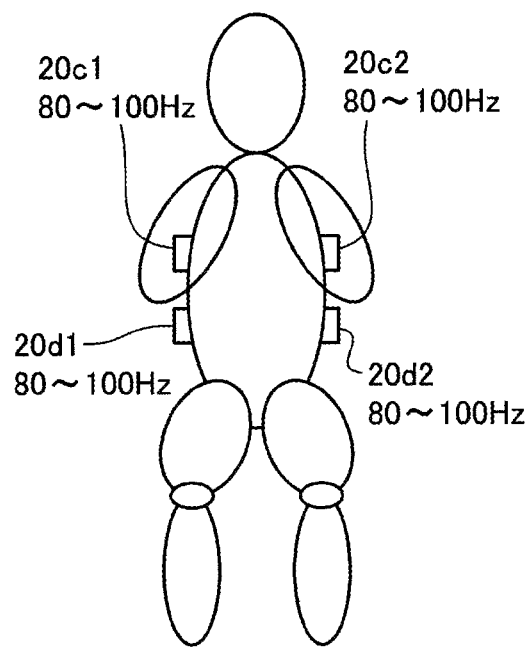

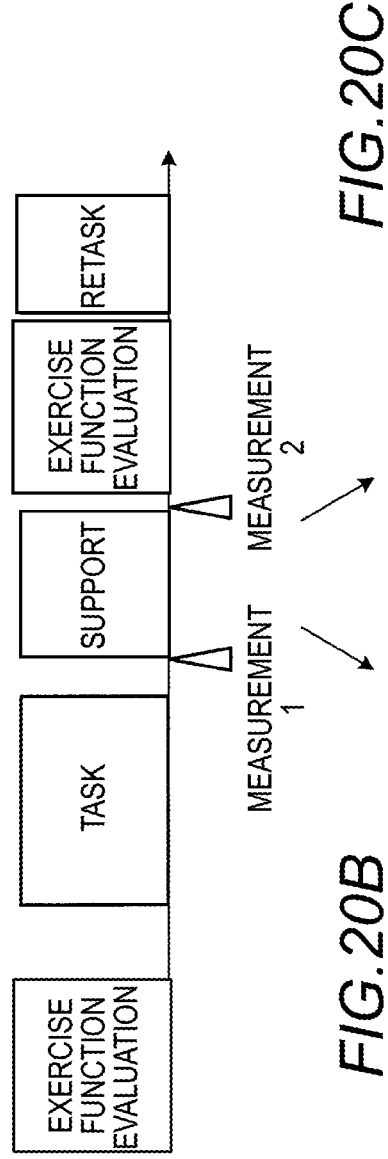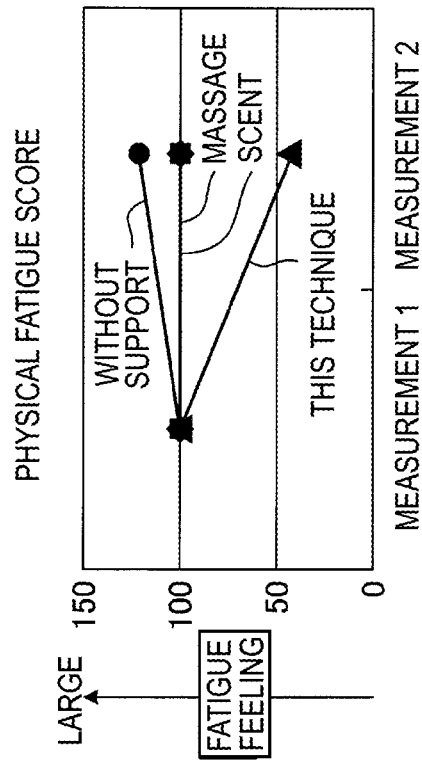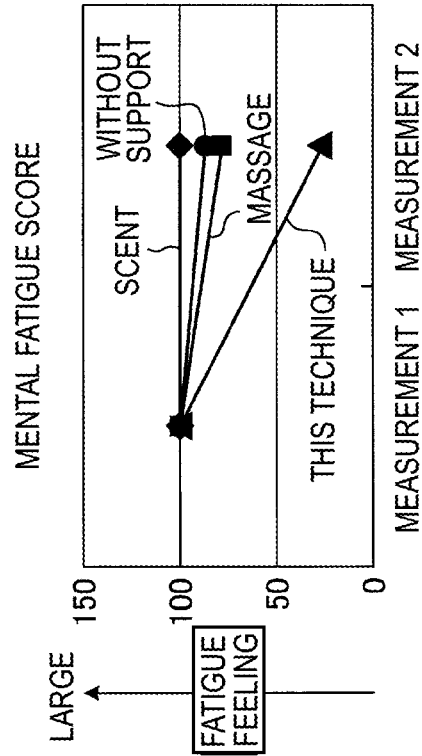

COMPARISON RESULT OF GRAVITY CENTER FLUCTUATION

TIME FROM STANDUP START TO STABILITY

GRAVITY CENTER FLUCTUATION AMOUNT AFTER STABILITY

PSYCHOSOMATIC STATE ADJUSTMENT SUPPORT DEVICE, PSYCHOSOMATIC STATE ADJUSTMENT SUPPORT METHOD, AND PSYCHOSOMATIC STATE ADJUSTMENT SUPPORT PROGRAM

CROSS REFERENCE TO RELATED APPLICATIONS

This application is based on and claims priority under 35 U.S.C. § 119 to Japanese Patent Application 2018-217555, filed on Nov. 20, 2018, the entire contents of which are incorporated herein by reference.

TECHNICAL FIELD

This disclosure relates to a psychosomatic state adjustment support device, a psychosomatic state adjustment support method, and a psychosomatic state adjustment support program.

BACKGROUND DISCUSSION

There are various psychosomatic states required in a case where an occupant of a moving body such as an automobile arrives at a destination. For example, a positive mental state is required in a case where the destination is a place, such as a company or a school, where intellectual work is mainly performed. For example, a relaxed mental state is required in a case where the destination is home. For example, a nimble body state is required in a case where the destination is a place where exercise is performed.

Examples of the related art include Japanese Patent No. 5028071 and JP 2017-154650A.

However, there is no technique that can flexibly induce the psychosomatic state of the occupant to a target psychosomatic state according to the destination in the related art.

Thus, a need exists for a psychosomatic state adjustment support device, a psychosomatic state adjustment support method, and a psychosomatic state adjustment support program which are not susceptible to the drawback mentioned above.

SUMMARY

A psychosomatic state adjustment support device according to an aspect of this disclosure includes a storage section that stores a target psychosomatic state for each destination of a moving body, a specification section that specifies a current psychosomatic state of an occupant of the moving body, an acquisition section that acquires a destination of the moving body, a deciding section that decides a vibration pattern based on the target psychosomatic state according to the destination and the current psychosomatic state, and a control section that applies a vibration stimulation to the occupant by causing a vibration applying section provided in a seat on which the occupant is seated to vibrate based on the vibration pattern.

A psychosomatic state adjustment support method according to another aspect of this disclosure is a psychosomatic state adjustment support method by a psychosomatic state adjustment support device including a storage section that stores a target psychosomatic state for each destination of a moving body. The method includes a specification step of specifying a current psychosomatic state of an occupant of the moving body, an acquisition step of acquiring a destination of the moving body, a deciding step of deciding a vibration pattern based on the target psychosomatic state according to the destination and the current psychosomatic state, and a control step of applying a vibration stimulation to the occupant by causing a vibration applying section provided in a seat on which the occupant is seated to vibrate based on the vibration pattern.

A computer-readable medium storing a psychosomatic state adjustment support program according to another aspect of this disclosure causes a computer including a storage section that stores a target psychosomatic state for each destination of a moving body to execute a specification step of specifying a current psychosomatic state of an occupant of the moving body, an acquisition step of acquiring a destination of the moving body, a deciding step of deciding a vibration pattern based on the target psychosomatic state according to the destination and the current psychosomatic state, and a control step of applying a vibration stimulation to the occupant by causing a vibration applying section provided in a seat on which the occupant is seated to vibrate based on the vibration pattern.

BRIEF DESCRIPTION OF THE DRAWINGS

The foregoing and additional features and characteristics of this disclosure will become more apparent from the following detailed description considered with the reference to the accompanying drawings, wherein:

FIG. 1 is an exemplary perspective view of a state in which a part of a vehicle cabin of a vehicle according to an embodiment is seen through;

FIG. 5 is an explanatory table of a vibration pattern and the like according to the embodiment;

FIGS. 8A and 8B are explanatory diagrams of a kinesthetic illusion;

FIG. 9 is an explanatory diagram of applying vibration stimulations to skeletal muscles in the embodiment;

FIGS. 16A and 16B are explanatory diagrams of a vibration pattern G in the embodiment;

FIG. 17 is an explanatory diagram of a vibration pattern H in the embodiment;

FIGS. 20A, 20B, and 20C are diagrams showing a fatigue score and the like in an evaluation experiment of the embodiment;

DETAILED DESCRIPTION

Embodiments relating to a psychosomatic state adjustment support device, a psychosomatic state adjustment support method, and a psychosomatic state adjustment support program disclosed here will be described below with reference to drawings.

In this embodiment, a case of a vehicle is taken as an example of a moving body. An example of the vehicle of the embodiment may be an automobile with an internal combustion engine (not shown) as a drive source, that is, an internal combustion engine automobile, or an automobile with an electric motor (not shown) as the drive source, that is, an electric vehicle or a fuel cell vehicle. An example thereof may be a hybrid vehicle with both the internal combustion engine and the electric motor as the drive source, or an automobile including another drive source. Various transmissions and various devices, such as systems and components, necessary for driving the internal combustion engine and the electric motor can be mounted on the vehicle. It is possible to set variously a method, the number, a layout, and the like of devices related to the drive of wheels in the vehicle.

Figure 1:
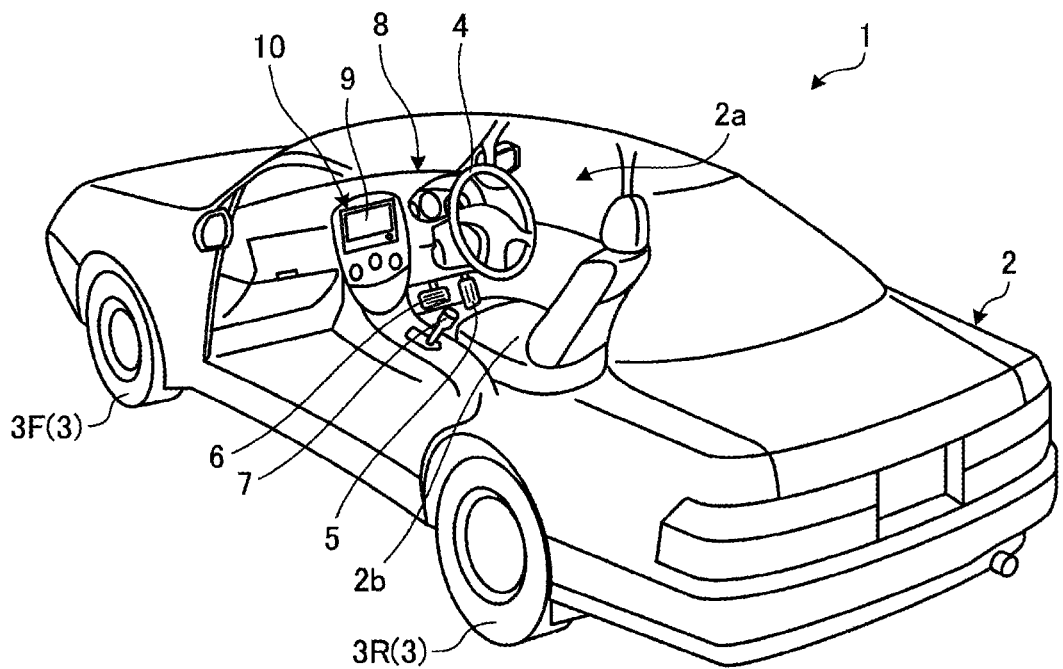

FIG. 1 is an exemplary perspective view of a state in which a part of a vehicle cabin of a vehicle 1 according to the embodiment is seen through. The vehicle 1 is, for example, a four-wheel automobile and has two front wheels 3F right and left and two rear wheels 3R right and left. Any of these four wheels 3 may be configured to be steerable. The left front wheel 3F and the left rear wheel 3R are shown in FIG. 1.

A vehicle body 2 includes a vehicle cabin 2a in which an occupant (not shown) gets on. A steering section 4, an acceleration operation section 5, a braking operation section 6, a transmission operation section 7, and the like are provided in the vehicle cabin 2a, facing a seat 2b on which a driver as the occupant is seated.

An example of the steering section 4 is a steering wheel that protrudes from a dashboard 8. An example of the acceleration operation section 5 is an accelerator pedal positioned under a foot of the driver. An example of the braking operation section 6 is a brake pedal positioned under a foot of the driver. An example of the transmission operation section 7 is a shift lever that protrudes from a center console. The steering section 4, the acceleration operation section 5, the braking operation section 6, and the transmission operation section 7 are not limited thereto.

A monitor device 10 having a display screen 9 is provided in the vehicle cabin 2a. The monitor device 10 is provided, for example, at the center of the dashboard 8 in a vehicle width direction. An example of the display screen 9 is a liquid crystal display (LCD) or an organic electroluminescent display (OELD). It is possible for the driver to visually recognize an image to be displayed on the display screen 9.

The monitor device 10 includes an operation input section (not shown) such as a touch panel, a switch, a dial, a joystick, or a push button. The monitor device 10 may also be used as a navigation system or an audio system.

Figure 2:
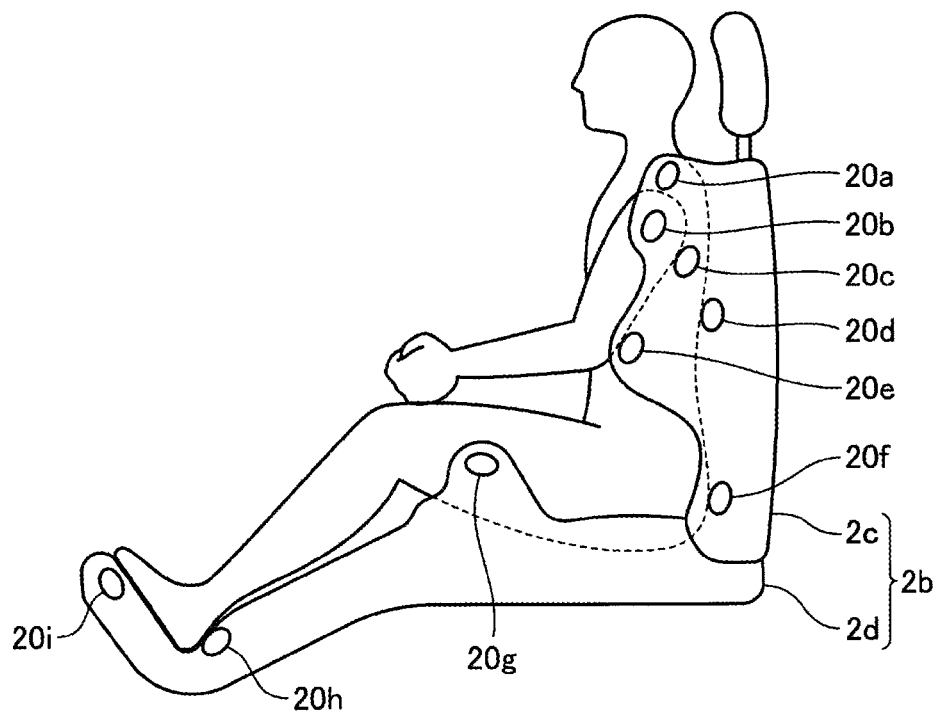
FIG. 2 is a diagram showing a disposition example of a vibration device according to the embodiment.

The seat 2b is provided with a plurality of vibration devices 20 that apply mechanical vibration stimulations to a body of the driver. FIG. 2 is a diagram showing a disposition example of the vibration devices 20 according to the embodiment. FIG. 2 is a side view of the seat 2b in a state where the driver is seated. Here, the plurality of vibration devices 20 include a pair of right and left vibration devices 20a to 20i.

The vibration device 20a is embedded at a position where the vibration stimulation can be applied to a tendon of a trapezius muscle of the occupant in a backrest portion 2c of the seat 2b.

The vibration device 20b is embedded at a position where the vibration stimulation can be applied to a tendon of a deltoid muscle of the occupant in the backrest portion 2c of the seat 2b.

The vibration device 20c is embedded at a position where the vibration stimulation can be applied to a tendon of a front saw muscle of the occupant in the backrest portion 2c of the seat 2b.

The vibration device 20d is embedded at a position where the vibration stimulation can be applied to a tendon of a latissimus dorsi muscle of the occupant in the backrest portion 2c of the seat 2b.

The vibration device 20e is embedded at a position where the vibration stimulation can be applied to a tendon of an external oblique muscle of the occupant in the backrest portion 2c of the seat 2b.

The vibration device 20f is embedded at a position where the vibration stimulation can be applied to a tendon of a gluteus medius muscle of the occupant in the backrest portion 2c of the seat 2b.

The vibration device 20g is embedded at a position where the vibration stimulation can be applied to the tendon of an outer vastus muscle of the occupant in a seat portion 2d of the seat 2b.

The vibration device 20h is embedded at a position where the vibration stimulation can be applied to an Achilles tendon (calcaneus tendon) of the occupant in the seat portion 2d of the seat 2b. The Achilles tendon is a tendon that attaches a gastrocnemius muscle and a soleus muscle of a foot calf to a calcaneal tuberosity in a heel bone.

The vibration device 20i is embedded at a position where the vibration stimulation can be applied to the tendon of a plantaris muscle of the occupant in the seat portion 2d of the seat 2b.

Each vibration device 20 does not necessarily need to be embedded in the seat 2b. Some or all of the plurality of vibration devices 20 may be provided in a seat cover that covers the seat 2b, a cushion disposed between the seat 2b and the driver, or the like. The vibration devices 20 provided in the seat 2b are not limited to the above example.

Each of these vibration devices 20 is controlled by an electronic control unit (ECU) 21 (FIG. 3) as the psychosomatic state adjustment support device of the embodiment.

Here, the following matters are known from general knowledge and experiments by the inventors of this disclosure. First, when a vibration stimulation having a frequency in a range of 80 to 100 Hz (frequency that promotes muscle tone) is applied to the tendon of the muscle of a subject, it is possible to induce a kinesthetic illusion, as if the muscle is stretched, in the brain of the subject. This is because a muscle spindle, which is a receptor emitting a signal when a muscle is stretched, is forced to be excited by the vibration stimulation having the frequency in the above range and emits the signal.

The kinesthetic illusion is an illusion of the brain as if a subject is actually exercising even though the subject is not actually exercising. The activity of a supplementary motor area of the brain increases during the kinesthetic illusion. It is considered that the increase in the activity of the supplementary motor area causes the increase in an information input to the brainstem reticular formation related to a degree of arousal of the brain and as a result, the brain can be in an arousal state.

Further, when a vibration stimulation having a frequency in a range of 40 to 60 Hz (frequency that suppresses muscle tone) is applied to the tendon of a skeletal muscle of the subject, it is possible to suppress the muscle tone.

In this embodiment, a technique will be described in which a psychosomatic state of the occupant can be induced to a target psychosomatic state flexibly according to a destination by applying the vibration stimulation having the high frequency (80 to 100 Hz) and the vibration stimulation having the low frequency (40 to 60 Hz) to a predetermined skeletal muscle tendon.

Figure 3:
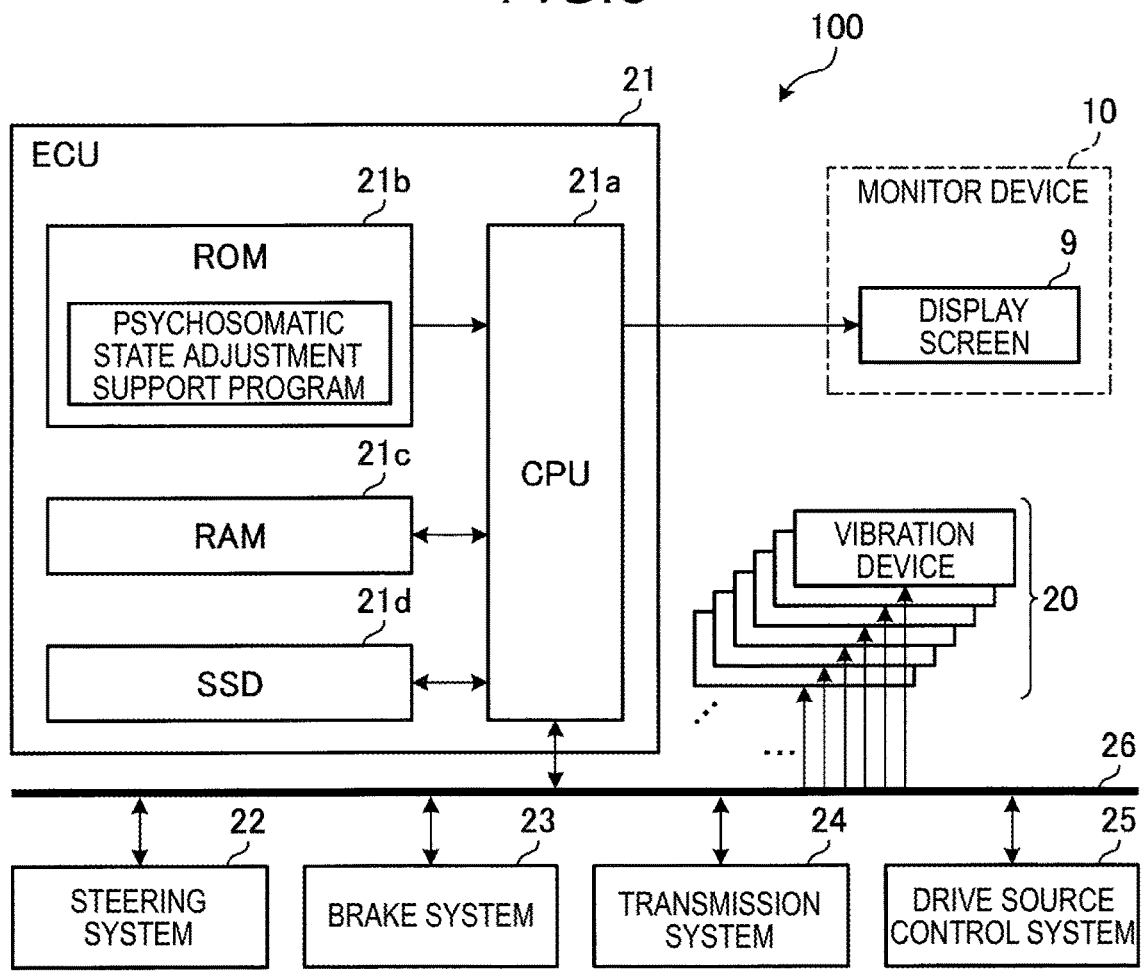
FIG. 3 is an exemplary block diagram of a configuration of a psychosomatic state adjustment support system according to the embodiment.

FIG. 3 is an exemplary block diagram of a configuration of a psychosomatic state adjustment support system 100 according to the embodiment. The psychosomatic state adjustment support system 100 includes an ECU 21, a steering system 22, a brake system 23, a transmission system 24, a drive source control system 25, and an in-vehicle network 26 in addition to the monitor device 10 and the plurality of vibration devices 20. The ECU 21, the steering system 22, the brake system 23, the transmission system 24, and the drive source control system 25 are electrically connected to the in-vehicle network 26. The in-vehicle network 26 is configured as, for example, a controller area network (CAN).

The steering system 22 detects torque applied to the steering section 4 by the driver and transmits the detected value of the torque to the ECU 21. The steering system 22 is electrically controlled by the ECU 21 or the like to steer the wheels 3. Examples of the steering system 22 are an electric power steering system and a steer by wire (SBW) system. The steering system 22 may steer one wheel 3 or may steer a plurality of wheels 3.

The brake system 23 detects a position of a movable portion of the braking operation section 6 and transmits the detected value to the ECU 21. The brake system 23 is electrically controlled by the ECU 21 or the like to apply braking force to the wheels 3 and thus to the vehicle 1 through an actuator (not shown). Examples of the brake system 23 are an anti-lock brake system (ABS) that suppresses the locking of a brake, an electronic stability control (ESC) that suppresses a sideslip of the vehicle 1 during cornering, an electric brake system that reinforces brake force (executes brake assist), and a brake by wire (BBW).

The transmission system 24 detects a position of a movable portion of the transmission operation section 7. The transmission system 24 can detect a position of a lever, an arm, a button, or the like as the movable portion of the transmission operation section 7. The transmission system 24 transmits the detected value to the ECU 21. The transmission system 24 is electrically controlled by the ECU 21 or the like to switch a transmission ratio of a transmission mechanism (not shown).

The drive source control system 25 detects a position of a movable portion of the acceleration operation section 5 and transmits the detected value to the ECU 21. The drive source control system 25 is electrically controlled by the ECU 21 or the like to increase or decrease an output of the drive source.

The ECU 21 includes, for example, a central processing unit (CPU) 21a, a read only memory (ROM) 21b, a random access memory (RAM) 21c, and a solid state drive (SSD) 21d. The CPU 21a is an arithmetic device that can execute a program. The ROM 21b, the RAM 21c, and the SSD 21d are storage devices that can store a program and data. That is, the ECU 21 has a hardware configuration similar to that of a computer.

The CPU 21a can execute various arithmetic processes and controls such as control of the vehicle 1 based on a predetermined program. The CPU 21a further executes the psychosomatic state adjustment support program installed and stored in the ROM 21b to realize a function as the psychosomatic state adjustment support device according to the embodiment. That is, the ECU 21 is an example of the psychosomatic state adjustment support device according to the embodiment. The following psychosomatic state adjustment support may be performed, for example, for a driver during autonomous driving, or for a passenger other than the driver regardless of whether the driving is autonomous.

The RAM 21c temporarily stores various types of data used in calculations performed by the CPU 21a. The SSD 21d is a rewritable nonvolatile storage device and can store data even in a case where the power of the ECU 21 is turned off. The CPU 21a, ROM 21b, RAM 21c, and the like may be integrated into the same package. The ECU 21 may have a configuration in which another logic arithmetic processor such as a digital signal processor (DSP), a logic circuit, or the like is used instead of the CPU 21a. A hard disk drive (HDD) may be provided instead of the SSD 21d, or the SSD 21d or the HDD may be provided separately from the ECU 21.

The psychosomatic state adjustment support program may be installed in the SSD 21d instead of the ROM 21b. The psychosomatic state adjustment support program may be provided by being recorded on a computer-readable recording medium, such as a CD-ROM, a flexible disk (FD), a CD-R, a digital versatile disk (DVD), or a flash memory, in a file having a format that can be installed in a computer or having an executable format.

The psychosomatic state adjustment support program may be stored in a computer connected to a network such as the Internet and provided by being downloaded through the network. The psychosomatic state adjustment support program may be provided or distributed through a network such as the Internet.

Figure 4:
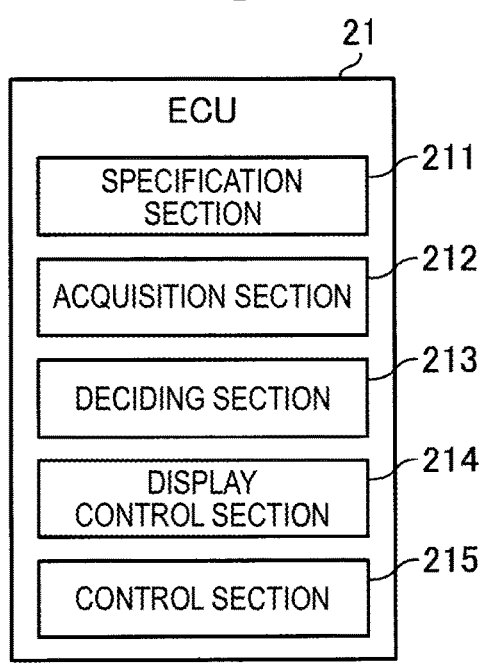
FIG. 4 is a block diagram showing an example of a functional configuration of an ECU as the psychosomatic state adjustment support device according to the embodiment.

FIG. 4 is a block diagram showing an example of a functional configuration of the ECU 21 as the psychosomatic state adjustment support device according to the embodiment. The ECU 21 causes the CPU 21a to execute a predetermined program to function as a specification section 211, an acquisition section 212, a deciding section 213, a display control section 214, and a control section 215. The storage section formed by the ROM 21b, the SSD 21d, and the like stores various types of information such as the target psychosomatic state for each destination of the moving body.

The specification section 211 specifies a current psychosomatic state of the occupant of the moving body. The acquisition section 212 acquires the destination of the moving body. The deciding section 213 decides a vibration pattern based on the target psychosomatic state according to the destination and the current psychosomatic state. The control section 215 causes the vibration devices 20, provided in the seat 2b on which the occupant is seated, to vibrate based on the vibration pattern decided by the deciding section 213 to apply the vibration stimulation to the occupant.

Here, FIG. 5 is an explanatory table of a vibration pattern and the like of the embodiment. There are two types of occupant activities, that is, a mental activity and a physical activity. In this embodiment, there are two types of targets of the mental activity, that is, a positive mental state and a relaxed mental state. There is a nimble body state as a target of the physical activity.

Figure 6:
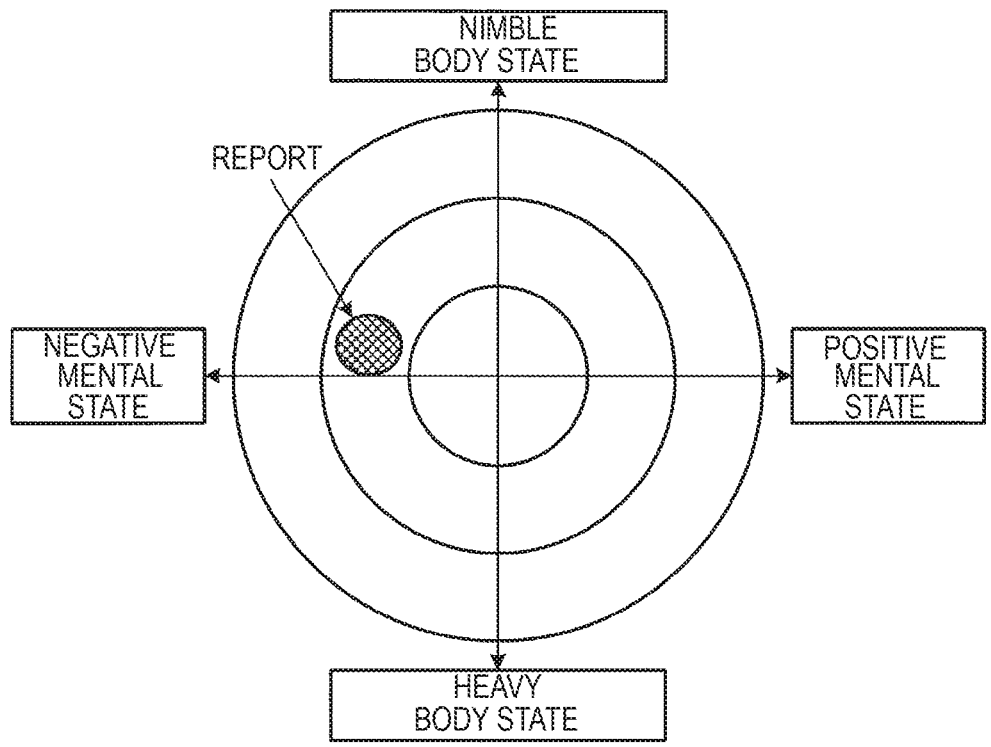
FIG. 6 is a diagram showing an example of an input screen in the embodiment.

Here, FIG. 6 is a diagram showing an example of an input screen in the embodiment. The storage section stores the target psychosomatic state for each destination of the moving body as two-dimensional information which is information in which each of the destinations is disposed on a two-dimensional plane having two axes orthogonal to each other of a body state and a mental state. The display control section 214 causes a display section to display a two-dimensional planar image having two axes orthogonal to each other of the body state and the mental state (input screen in FIG. 6) corresponding to the two-dimensional information, as a screen for inputting the current psychosomatic state of the occupant.

In the input screen of FIG. 6, the vertical axis corresponds to the body state, and the horizontal axis corresponds to the mental state. Specifically, there is a body state in which the body is more nimble (body is in a good state) toward the upper part and there is a body state in which the body is heavier (body is in a languid state, muscle is stiff) toward the lower part, on the input screen.

The mental state becomes more positive (clearly awake, concentrate at any time) toward the right side and the mental state becomes more negative (sleepy, not motivated) toward the left side, on the input screen.

When the occupant gets on the vehicle 1, the occupant inputs (reports, designates) the current psychosomatic state (mental activity level and physical activity level) of oneself using the input screen (FIG. 6) displayed on the display screen 9. Then, the specification section 211 can specify the current psychosomatic state of the occupant by specifying a position on the input screen.

Figure 7:
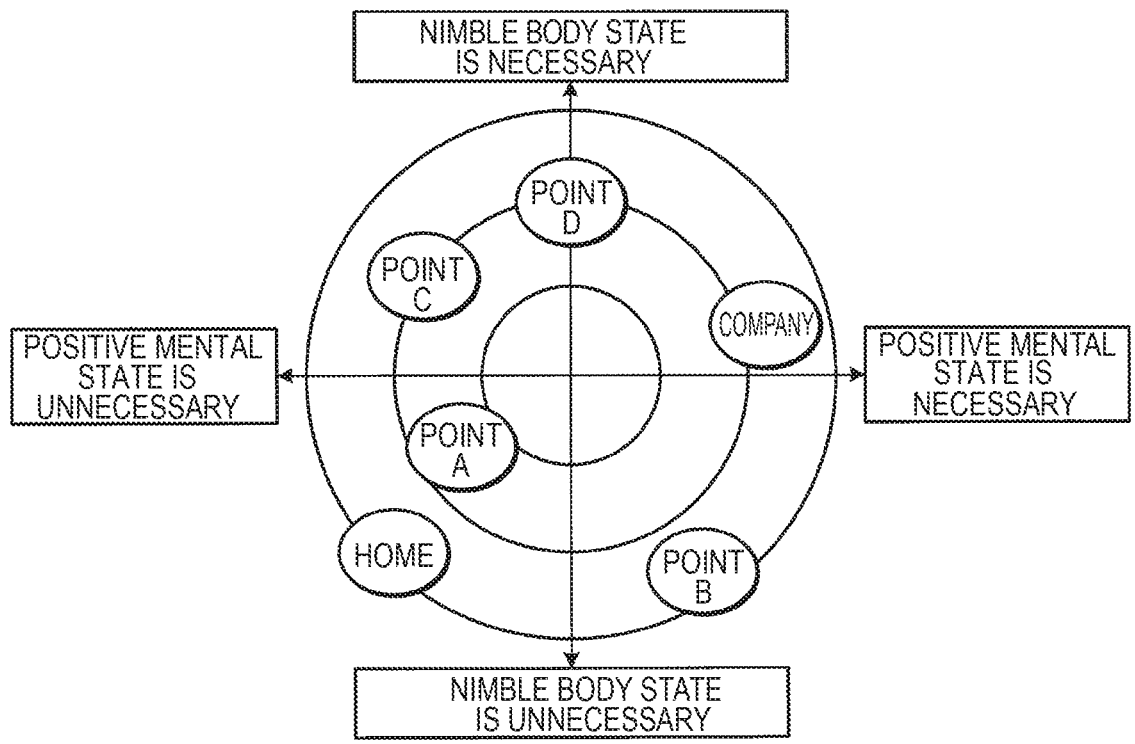
FIG. 7 is a diagram showing an example of target psychosomatic state information for each destination in the embodiment.

Here, FIG. 7 is a diagram showing an example of target psychosomatic state information for each destination in the embodiment. The target psychosomatic state information for each destination is stored in the storage section. The target psychosomatic state information for each destination shown in FIG. 7 corresponds to the input screen of FIG. 6. That is, the vertical axis corresponds to the body state, and the horizontal axis corresponds to the mental state. Specifically, the nimble body state is necessary toward the upper part (scenes where advanced movement, complicated movement, and quick movement are required) and the nimble body state is unnecessary toward the lower part (scene to relax), in the target psychosomatic state information for each destination.

Further, the more positive mental state is necessary toward the right side (scenes where high arousal, high concentration, and advanced thinking are required) and the more positive mental state is unnecessary toward the left side, in the target psychosomatic state information for each destination.

In a case where the occupant inputs (selects) the destination using the touch panel on the monitor device 10, the deciding section 213 decides the vibration pattern based on a difference between a position of the destination in the target psychosomatic state information for each destination shown in FIG. 7 and the position indicating the current psychosomatic state of the occupant on the input screen shown in FIG. 6.

Here, the kinesthetic illusion will be described. FIGS. 8A and 8B are explanatory diagrams of the kinesthetic illusion. For example, in a case where a vibration device is attached to a wrist of the subject (FIG. 8A), the subject feels an illusion that the wrist thereof is bent even though the wrist does not actually move when a vibration stimulation of 100 Hz is applied to the vibration device (FIG. 8B).

Here, FIG. 9 is an explanatory diagram of applying vibration stimulations to skeletal muscles in the embodiment. For example, a skeletal muscle A is a right external oblique muscle and a skeletal muscle B is a left external oblique muscle. During time Ta, the vibration stimulation having the high frequency (80 to 100 Hz) is applied to the skeletal muscle A, and the vibration stimulation having the low frequency (40 to 60 Hz) is applied to the skeletal muscle B. During time Tb, the vibration stimulation having the low frequency (40 to 60 Hz) is applied to the skeletal muscle A, and the vibration stimulation having the high frequency (80 to 100 Hz) is applied to the skeletal muscle B. Such vibration stimulations with time Ta and time Tb are alternately applied. With this, the muscle tone is promoted in the skeletal muscle to which the vibration stimulation having the high frequency (80 to 100 Hz) is applied, and the muscle tone is suppressed in the skeletal muscle to which the vibration stimulation having the low frequency (40 to 60 Hz) is applied.

Returning to FIG. 5, in a case where the target is the positive mental state, specifically, a low state in arousal level, motivation, and desire is shifted to a high state therein, for example. For this purpose, there are two kinds of induction, that is, the kinesthetic illusion of a light exercise and of breathing to inhale deeply.

The light exercise is known to be effective in forming the positive mental state, but it is difficult to exercise in the vehicle 1. Three types of induction of kinesthetic illusion of the light exercise, that is, vibration patterns A, B, and C are prepared in this embodiment.

The vibration patterns A, B, and C are patterns for inducing the kinesthetic illusion of the light exercise by repeating, for each first predetermined time, a first vibration pattern for applying a vibration at a first frequency that promotes the muscle tone with respect to one skeletal muscle of a predetermined set of skeletal muscles used for the light exercise and a vibration at a second frequency that suppresses the muscle tone with respect to the other skeletal muscle thereof, and a second vibration pattern for applying the vibration at the second frequency with respect to the one skeletal muscle and the vibration at the first frequency with respect to the other skeletal muscle.

Figures 10A, 10B:
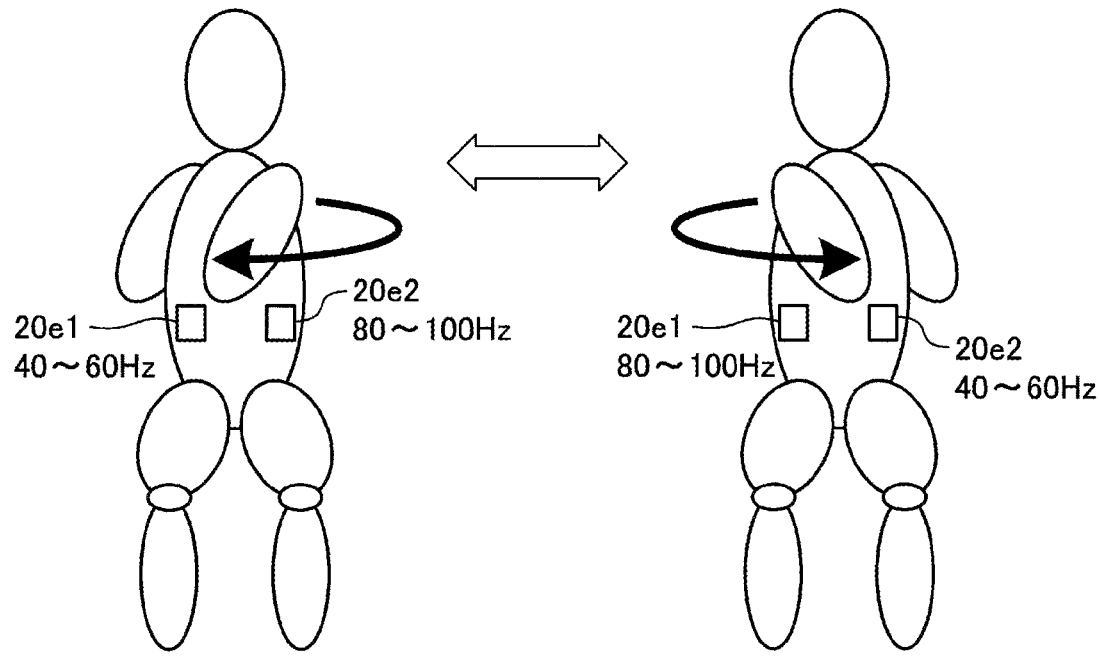
FIGS. 10A and 10B are explanatory diagrams of a vibration pattern A in the embodiment.

FIGS. 10A and 10B are explanatory diagrams of the vibration pattern A in the embodiment. In the vibration pattern A, first, the vibration stimulation having the high frequency (80 to 100 Hz) is applied to the left external oblique muscle by a vibration device 20e2 (one of the pair of vibration devices 20e) and the vibration stimulation having the low frequency (40 to 60 Hz) is applied to the right external oblique muscle by a vibration device 20e1 (the other of the pair of vibration devices 20e) as shown in FIG. 10A.

Next, the vibration stimulation having the low frequency (40 to 60 Hz) is applied to the left external oblique muscle by the vibration device 20e2 and the vibration stimulation having the high frequency (80 to 100 Hz) is applied to the right external oblique muscle by the vibration device 20e1 as shown in FIG. 10B.

The above vibration patterns are repeated for each predetermined time, and thus it is possible to induce a kinesthetic illusion of twisting the trunk (twist right and left).

Figures 11A, 11B:
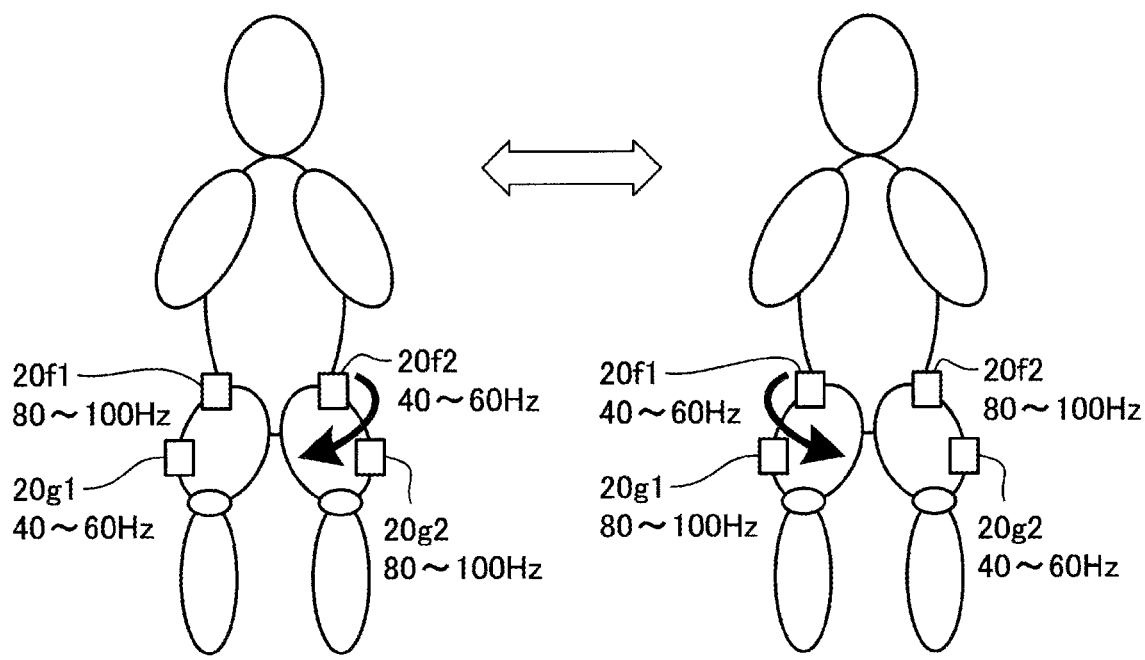
FIGS. 11A and 11B are explanatory diagrams of a vibration pattern B in the embodiment.

FIGS. 11A and 11B are explanatory diagrams of the vibration pattern B in the embodiment. In the vibration pattern B, first, the vibration stimulation having the high frequency (80 to 100 Hz) is applied to the right gluteus medius muscle by a vibration device 20f1 and the vibration stimulation having the high frequency (80 to 100 Hz) is applied to the left outer vastus muscle by a vibration device 20g2 as shown in FIG. 11A. The vibration stimulation having the low frequency (40 to 60 Hz) is applied to the left gluteus medius muscle by the vibration device 20f2 and the vibration stimulation having the low frequency (40 to 60 Hz) is applied to the right outer vastus muscle by the vibration device 20g1.

Next, the vibration stimulation having the low frequency (40 to 60 Hz) is applied to the right gluteus medius muscle by the vibration device 20f1 and the vibration stimulation having the low frequency (40 to 60 Hz) is applied to the left outer vastus muscle by the vibration device 20g2 as shown in FIG. 11B. The vibration stimulation having the high frequency (80 to 100 Hz) is applied to the left gluteus medius muscle by the vibration device 20f2 and the vibration stimulation having the high frequency (80 to 100 Hz) is applied to the right outer vastus muscle by a vibration device 20g1.

The above vibration patterns are repeated for each predetermined time, and thus it is possible to induce a kinesthetic illusion of alternately moving thighs.

Figures 12A, 12B:
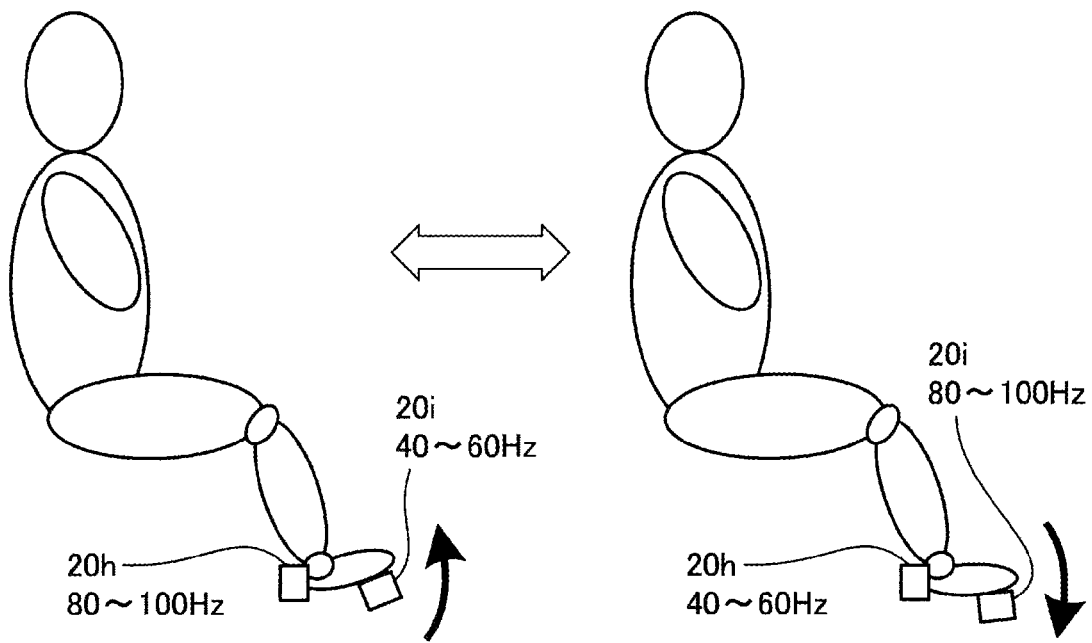
FIGS. 12A and 12B are explanatory diagrams of a vibration pattern C in the embodiment.

FIGS. 12A and 12B are explanatory diagrams of the vibration pattern C in the embodiment. In the vibration pattern C, first, the vibration stimulation having the high frequency (80 to 100 Hz) is applied to the Achilles tendon by the vibration device 20h and the vibration stimulation having the low frequency (40 to 60 Hz) is applied to the plantaris muscle by the vibration device 20i as shown in FIG. 12A.

Next, the vibration stimulation having the low frequency (40 to 60 Hz) is applied to the Achilles tendon by the vibration device 20h and the vibration stimulation having the high frequency (80 to 100 Hz) is applied to the plantaris muscle by the vibration device 20i as shown in FIG. 12B.

The above vibration patterns are repeated for each predetermined time, and thus it is possible to induce a kinesthetic illusion of moving a foot tip up and down. This kinesthetic illusion is aimed at an illusion of skeletal muscle activity related to walking movement. The walking is a typical example of the light exercise that has effects of switching a mood and switching to the positive mental state.

Next, the induction of breathing to inhale deeply will be described. A vibration pattern D is a pattern for inducing the breathing to inhale deeply by repeating, for each second predetermined time, a third vibration pattern for applying the vibration at the first frequency that promotes the muscle tone with respect to the skeletal muscle stretched during inspiration and a vibration stop pattern for applying no vibration with respect to the skeletal muscle.

Figures 13A, 13B:
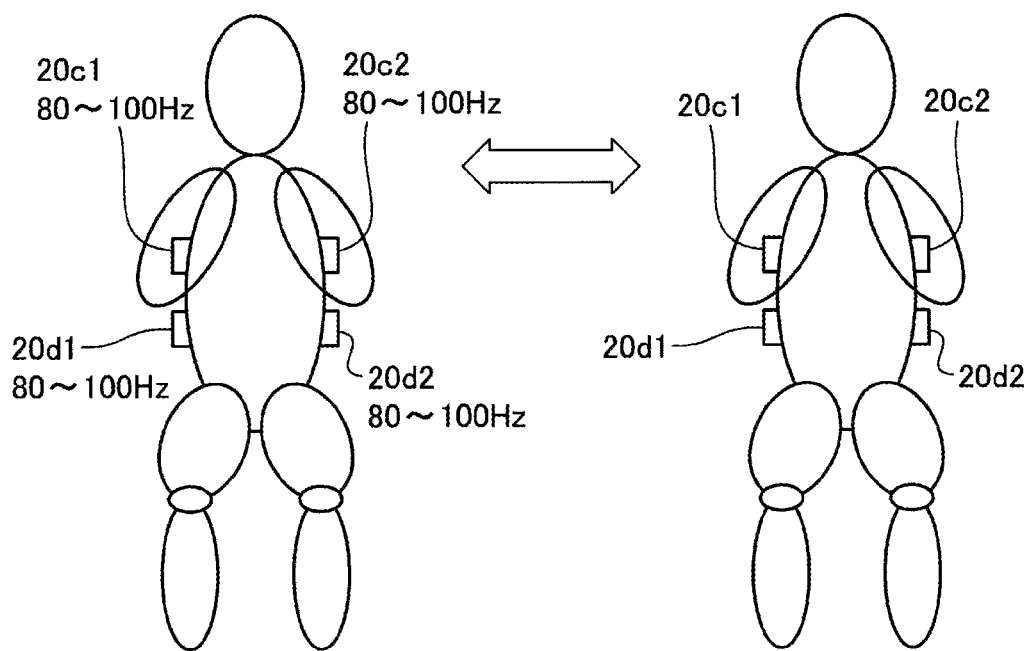
FIGS. 13A and 13B are explanatory diagrams of a vibration pattern D in the embodiment.

FIGS. 13A and 13B are explanatory diagrams of the vibration pattern D in the embodiment. First, the vibration stimulations having the high frequency (80 to 100 Hz) are respectively applied to the right front saw muscle and the left front saw muscle by vibration devices 20c1 and 20c2 and the vibration stimulations having the high frequency (80 to 100 Hz) are respectively applied to the right latissimus dorsi muscle and the left latissimus dorsi muscle by vibration devices 20d1 and 20d2 as shown in FIG. 13A.

Next, all vibrations are stopped as shown in FIG. 13B. The above operations are repeated for each predetermined time, and thus the inspiration ends early due to an illusion that the inspiration is sufficient by adding the muscle stretch illusion caused by the vibration stimulations at the initial stage when the latissimus dorsi muscle and the front saw muscle begin to stretch during inspiration. When the vibration stimulations are stopped after the vibration stimulations are performed for a predetermined time, the inspiration movement increases due to a reaction of the stop and thus an inspiration amount (ventilation amount) increases. An oxygen amount taken into the body increases by repeating the above operations, which leads to psychosomatic activity.

Returning to FIG. 5, in a case where the target is the relaxed mental state, specifically, a hyperarousal state such as frustration or anxiety is induced to a resting relaxed state, for example. For this purpose, there are two kinds of induction, that is, an illusion of rubbing and of breathing to exhale deeply.

The "rubbing" is a manual technique used in nursing/care, childcare, and the like, and can calm a crying baby down by, for example, rubbing or lightly touching a shoulder or back of the baby. In this embodiment, a sense of "being rubbed" is induced using a feature of the kinesthetic illusion. In the following, shoulder rubbing, back rubbing, and buttock rubbing that are widely known to have a calming effect are realized by vibration patterns E, F, and G.

The vibration patterns E, F, and G are patterns for inducing the rubbing illusion by repeating, for each third predetermined time, a fourth vibration pattern for applying a vibration at the first frequency that promotes the muscle tone with respect to one skeletal muscle of a predetermined set of skeletal muscles used for rubbing perception and a vibration at the second frequency that suppresses the muscle tone with respect to the other skeletal muscle thereof, and a fifth vibration pattern for applying the vibration at the second frequency with respect to the one skeletal muscle and the vibration at the first frequency with respect to the other skeletal muscle.

Figures 14A, 14B:
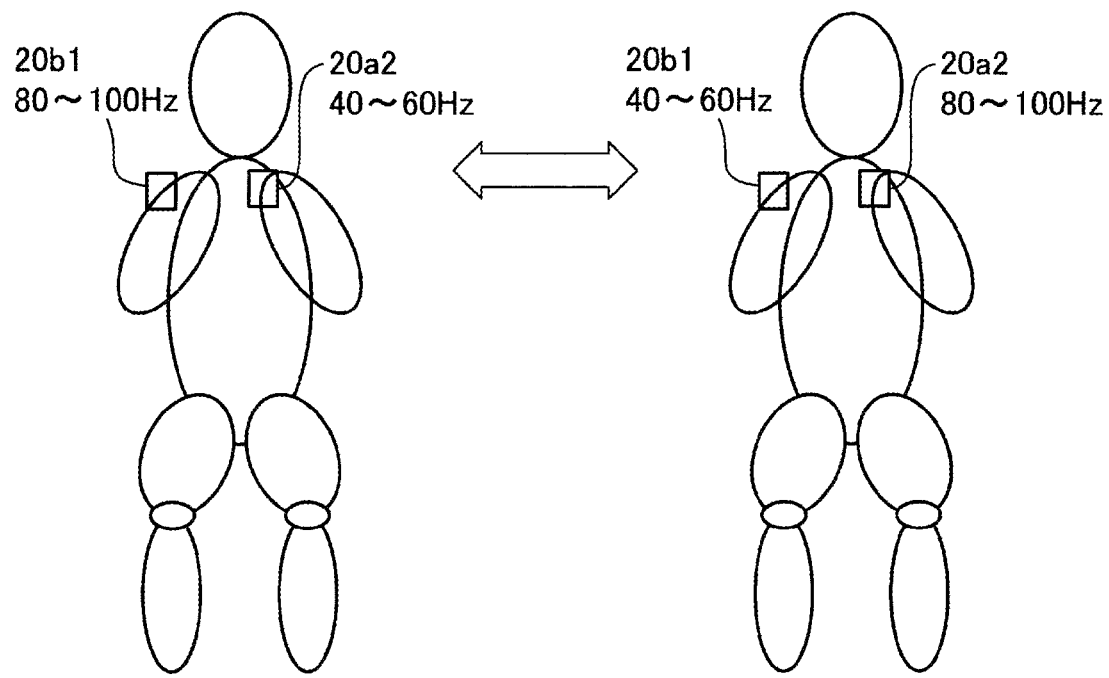
FIGS. 14A and 14B are explanatory diagrams of a vibration pattern E in the embodiment.

FIGS. 14A and 14B are explanatory diagrams of the vibration pattern E in the embodiment. In the vibration pattern E, first, the vibration stimulation having the high frequency (80 to 100 Hz) is applied to the right deltoid muscle by a vibration device 20b1 and the vibration stimulation having the low frequency (40 to 60 Hz) is applied to the left trapezius muscle by a vibration device 20a2 as shown in FIG. 14A.

Next, the vibration stimulation having the low frequency (40 to 60 Hz) is applied to the right deltoid muscle by the vibration device 20b1 and the vibration stimulation having the high frequency (80 to 100 Hz) is applied to the left trapezius muscle by the vibration device 20a2 as shown in FIG. 14B.

The above vibration patterns are repeated for each predetermined time, and thus it is possible to induce an illusion that the shoulder is rubbed.

Figures 15A, 15B:
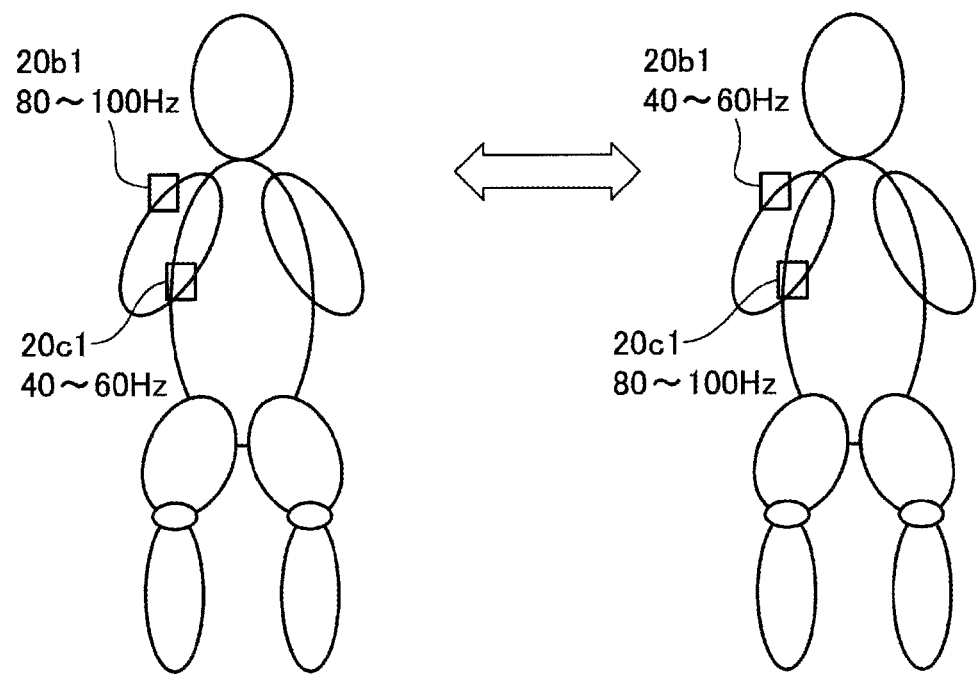
FIGS. 15A and 15B are explanatory diagrams of a vibration pattern F in the embodiment.

FIGS. 15A and 15B are explanatory diagrams of the vibration pattern F in the embodiment. In the vibration pattern F, first, the vibration stimulation having the high frequency (80 to 100 Hz) is applied to the right deltoid muscle by the vibration device $20b1$ and the vibration stimulation having the low frequency (40 to 60 Hz) is applied to the right front saw muscle by the vibration device $20c1$ as shown in FIG. 15A.

Next, the vibration stimulation having the low frequency (40 to 60 Hz) is applied to the right deltoid muscle by the vibration device $20b1$ and the vibration stimulation having the high frequency (80 to 100 Hz) is applied to the right front saw muscle by the vibration device $20c1$ as shown in FIG. 15B.

The above vibration patterns are repeated for each predetermined time, and thus it is possible to induce an illusion that the back is rubbed. A group of front saw muscles may be used instead of the front saw muscle.

FIGS. 16A and 16B are explanatory diagrams of the vibration pattern G in the embodiment. In the vibration pattern G, first, the vibration stimulation having the high frequency (80 to 100 Hz) is applied to the right gluteus medius muscle by the vibration device $20f1$ and the vibration stimulation having the low frequency (40 to 60 Hz) is applied to the left gluteus medius muscle by the vibration device $20f2$ as shown in FIG. 16A.

Next, the vibration stimulation having the low frequency (40 to 60 Hz) is applied to the right gluteus medius muscle by the vibration device $20f1$ and the vibration stimulation having the high frequency (80 to 100 Hz) is applied to the left gluteus medius muscle by the vibration device $20f2$ as shown in FIG. 16B.

The above vibration patterns are repeated for each predetermined time, and thus it is possible to induce an illusion that the buttock is rubbed.

Next, the induction of breathing to exhale deeply will be described. The vibration pattern H is a pattern for inducing the breathing to exhale deeply by performing, for a fourth predetermined time, a sixth vibration pattern for applying the vibration at the first frequency that promotes the muscle tone with respect to the skeletal muscle stretched during inspiration.

FIG. 17 is an explanatory diagram of the vibration pattern H in the embodiment. The vibration stimulations having the high frequency (80 to 100 Hz) are respectively applied to the right front saw muscle and the left front saw muscle by the vibration devices $20c1$ and $20c2$ and the vibration stimulations having the high frequency (80 to 100 Hz) are respectively applied to the right latissimus dorsi muscle and the left latissimus dorsi muscle by the vibration devices $20d1$ and $20d2$ as shown in FIG. 17.

Accordingly, the inspiration ends early due to an illusion that the inspiration is sufficient by adding the muscle stretch illusion caused by the vibration stimulations at the initial stage when the latissimus dorsi muscle and the front saw muscle begin to stretch during inspiration. This is performed for a predetermined time. In this case, excessive inspiration suppression is prevented by suppressing the intensity of the vibration stimulation to be applied to a small value, and thus a shift is made to a breathing pattern that exhales naturally and deeply. There is an inspiration-dominated breathing pattern in a case of the hyperarousal state such as frustration, anxiety, and thoughts. Therefore, it is possible to induce the relaxed mental state by shifting the breathing pattern to an expiration-dominated breathing pattern by this kinesthetic illusion.

Returning to FIG. 5, in a case where the target is the nimble body state, specifically, the vibration stimulation by a vibration pattern I is performed so as to promote activity (body diagram formation) to recognize again posture or movement of oneself in the brain in order to improve the exercise performance, for example.

The vibration pattern I is a pattern for creating a preparation state that improves a neural connection between the brain and each of a plurality of predetermined skeletal muscles and controls the skeletal muscles, by sequentially applying the vibration at the first frequency that promotes muscle tone to each of the plurality of skeletal muscles used for posture control, for each fifth predetermined time.

Figure 18:
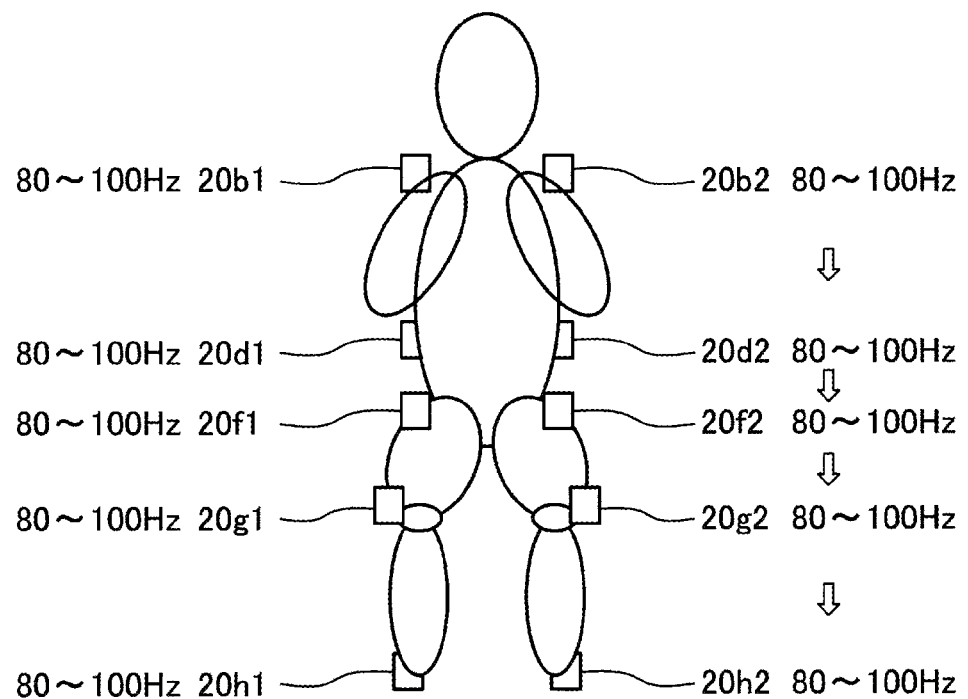
FIG. 18 is an explanatory diagram of a vibration pattern I in the embodiment.

FIG. 18 is an explanatory diagram of the vibration pattern I in the embodiment. First, the vibration stimulations having the high frequency (80 to 100 Hz) are respectively applied to the right deltoid muscle and the left deltoid muscle by the vibration devices $20b1$ and $20b2$ as shown in FIG. 18. Next, the vibration stimulations having the high frequency (80 to 100 Hz) are respectively applied to the right latissimus dorsi muscle and the left latissimus dorsi muscle by the vibration devices $20d1$ and $20d2$. Next, the vibration stimulations having the high frequency (80 to 100 Hz) are respectively applied to the right gluteus medius muscle and the left gluteus medius muscle by the vibration devices $20f1$ and $20f2$.

Next, the vibration stimulations having the high frequency (80 to 100 Hz) are respectively applied to the right outer vastus muscle and the left outer vastus muscle by the vibration devices $20g1$ and $20g2$. Next, the vibration stimulations having the high frequency (80 to 100 Hz) are respectively applied to the right Achilles tendon and the left Achilles tendon by vibration devices $20h1$ and $20h2$.

These vibration stimulations are sequentially applied at a predetermined time interval with low intensity. Accordingly, it is possible to create the preparation state that improves the neural connection between the brain and each skeletal muscle related to the posture control and controls each skeletal muscle. Therefore, it is possible to smoothly move related skeletal muscles (improve the exercise performance) and to experience the nimbleness of the body (lightness of movement) when a series of operations is performed in which the occupant arrives at the destination, gets up from the seat 2b, and gets off the vehicle.

Figure 19:
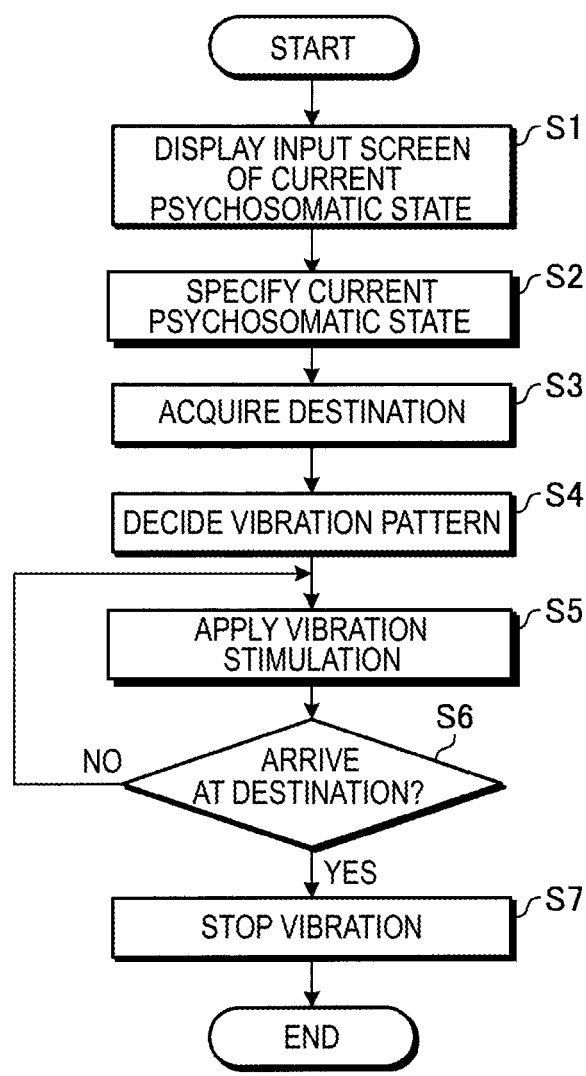
FIG. 19 is a flowchart showing a process performed by the ECU as the psychosomatic state adjustment support device according to the embodiment.

Next, a process by the ECU 21 as the psychosomatic state adjustment support device according to the embodiment will be described with reference to FIG. 19. FIG. 19 is a flowchart showing the process by the ECU 21 as the psychosomatic state adjustment support device according to the embodiment.

First, in step S1, the display control section 214 displays the input screen of the current psychosomatic state (FIG. 6) on the display screen 9.

The occupant inputs the current psychosomatic state of oneself using the input screen (FIG. 6) displayed on the display screen 9. In step S2, the specification section 211 specifies an input position on the input screen to specify the current psychosomatic state of the occupant.

Next, when the occupant inputs (selects) a destination using the touch panel of the monitor device 10, the acquisition section 212 acquires the destination (information) in step S3.

Next, in step S4, the deciding section 213 decides a vibration pattern based on a difference between a position of the destination in the target psychosomatic state information for each destination shown in FIG. 7 and the position indicating the current psychosomatic state of the occupant on the input screen shown in FIG. 6.

Next, in step S5, the control section 215 causes the vibration device 20 provided in the seat 2b on which the occupant is seated to vibrate based on the vibration pattern decided in step S4 to apply the vibration stimulation to the occupant.

Next, in Step S6, the control section 215 determines whether or not the vehicle 1 has arrived at the destination, and the process proceeds to step S7 in a case of Yes and returns to step S5 in a case of No.

In step S7, the control section 215 stops the vibration by the vibration device 20 and ends the process.

In this manner, with the psychosomatic state adjustment support system 100 according to this embodiment, it is possible to flexibly induce the psychosomatic state of the occupant to the target psychosomatic state according to the destination by deciding the vibration pattern based on the target psychosomatic state corresponding to the destination and the current psychosomatic state of the occupant.

It is possible to decide an appropriate vibration pattern only by the occupant inputting the current psychosomatic state on the input screen (FIG. 6).

It is possible to induce the occupant to the positive mental state due to the induction of the light exercise illusion by the vibration patterns A, B, and C.

It is possible to induce the occupant to the positive mental state due to the induction of the breathing to inhale deeply by the vibration pattern D.

It is possible to induce the occupant to the relaxed mental state due to the induction of the rubbing illusion by the vibration patterns E, F, and G.

It is possible to induce the occupant to the relaxed mental state due to the induction of the breathing to exhale deeply by the vibration pattern H.

It is possible to induce the occupant to the nimble body state due to the preparation of the skeletal muscle used for the posture control by the vibration pattern I.

On the other hand, for example, there is a technique in which a timing of changing an angle of a back surface portion of the seat is changed such that the arousal level of the occupant corresponds to the destination or a time zone in the related art. However, it is impossible to support to induce the relaxed mental state or a nimble body state only by inducing the increase in the arousal level (positive mental state) in the related art. In contrast, with the psychosomatic state adjustment support system 100 according to this embodiment, it is possible to flexibly induce the occupant to the positive mental state, the relaxed mental state, and the nimble body state according to the destination.

It is unnecessary to add or change the vibration device 20 from the conventional device, and thus it is possible to avoid an increase in a size, cost, or the like of the device.

Hereinafter, advantageous effects and the like with the psychosomatic state adjustment support device according to the embodiment will be described in more detail. FIGS. 20A, 20B, and 20C are diagrams showing a fatigue score and the like in an evaluation experiment of the embodiment. In this evaluation experiment, a 45-minute visual search task (task of repeatedly searching for sequentially numbers 1 to 25 randomly disposed) is performed, and a comparison is made in the magnitude of improvement in mental fatigue and physical fatigue in cases of four types of this technique (support technique in this embodiment), scent (support technique by a scent appealing a conventional mood change), massage (support technique by conventional press massage), and without support, after the task is executed. Specifically, exercise function evaluation, task (45 minutes), measurement 1, support (5 minutes), measurement 2, exercise function evaluation, and retask (5 minutes) are performed in a time series as shown in FIG. 20A.

Figure 23:
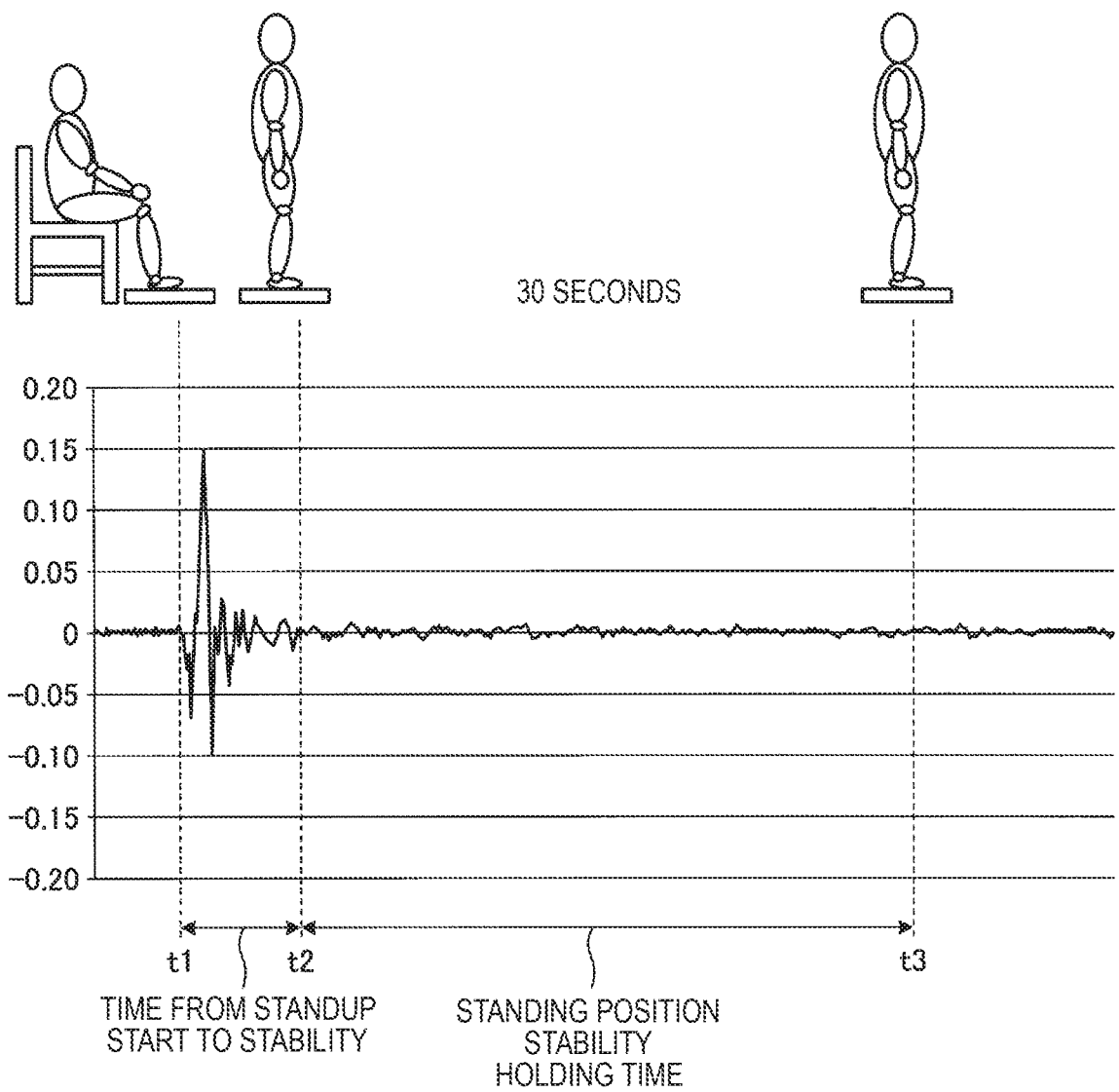
FIG. 23 is an explanatory diagram of a gravity center fluctuation evaluation in the evaluation experiment of the embodiment.

The exercise function evaluation is a gravity center fluctuation evaluation. Here, FIG. 23 is an explanatory diagram of the gravity center fluctuation evaluation in the evaluation experiment of the embodiment. In the gravity center fluctuation evaluation experiment, the subject position changes from a sitting position to a standing position and maintains the standing position. In the gravity center fluctuation evaluation, amounts of gravity center fluctuation for a time from standup start (timepoint t1) to standing position stability (timepoint t2) and a standing position stability holding time (timepoints t2 to t3) are compared before and after support.

The mental fatigue score has fallen most significantly in the case of this technique as shown in FIG. 20B. The score at the time of measurement 2 is represented with the score at the time of measurement 1 as 100 in FIG. 20B.

The physical fatigue score has fallen most significantly in the case of this technique as shown in FIG. 20C. The score at the time of measurement 2 is represented with the score at the time of measurement 1 as 100 in FIG. 20C.

Figure 21:
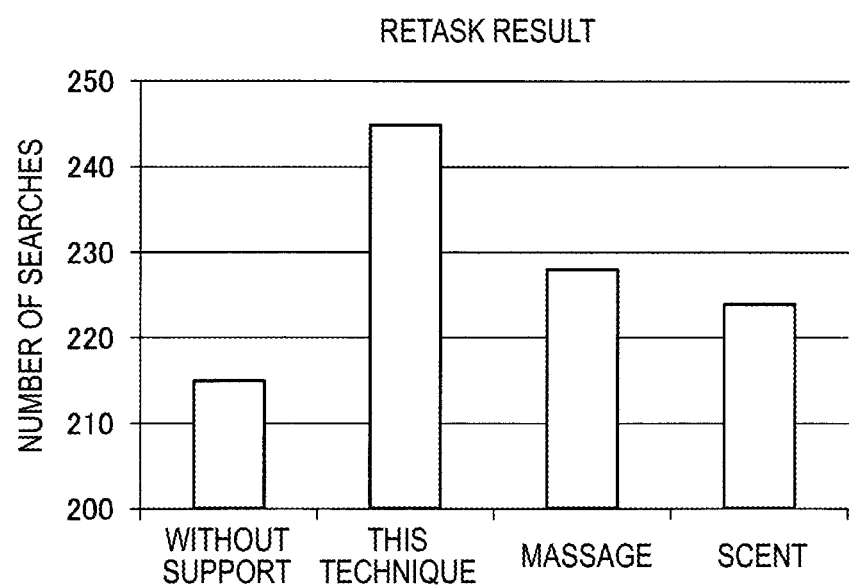
FIG. 21 is a diagram showing a result of a retask in the evaluation experiment of the embodiment.

Here, FIG. 21 is a diagram showing a result of the retask in the evaluation experiment of the embodiment. The result of the retask is the best in the case of this technique as shown in FIG. 21, and it can be considered that the reduction in mental fatigue and physical fatigue is reflected and thus the motivation or desire for the retask is recovered.

Figure 22A:
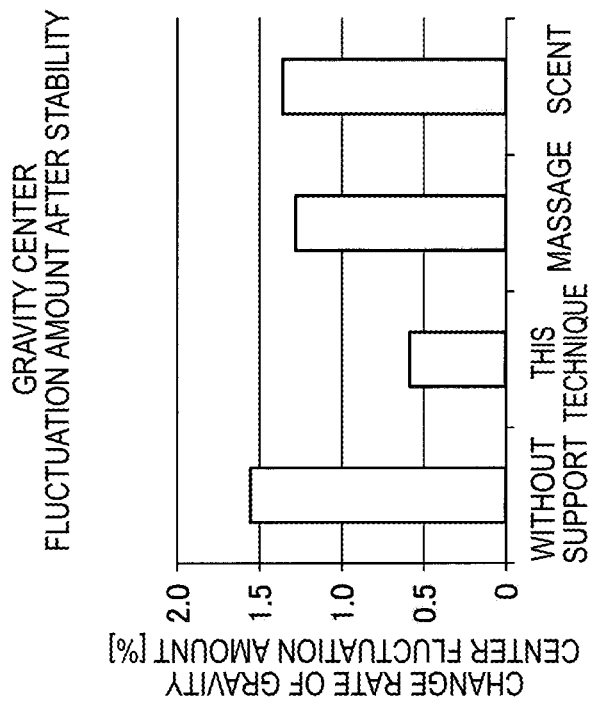
FIGS. 22A and 22B are diagrams showing results of exercise performance in the evaluation experiment of the embodiment.
Figure 22B:
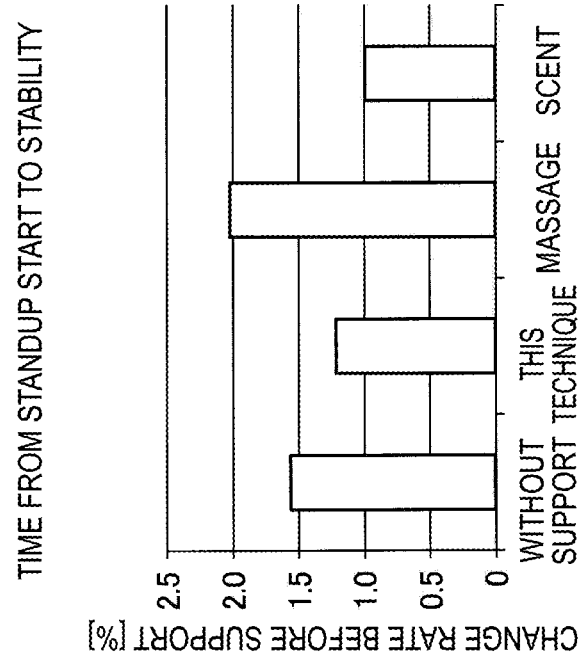

FIGS. 22A and 22B are diagrams showing results of the exercise performance in the evaluation experiment of the embodiment. FIG. 22A is a diagram representing a change rate (increase rate) before support for the time from standup start to standing position stability. The increase rate of this technique is lower than without support and massage.

FIG. 22B is a diagram representing a change rate (increase rate) before support for the amount of gravity center fluctuation after standing position stability. The increase rate of this technique is the lowest. That is, it can be considered that the ability to control body movements is most improved by this technique comprehensively from FIGS. 22A and 22B.

Figure 24A:
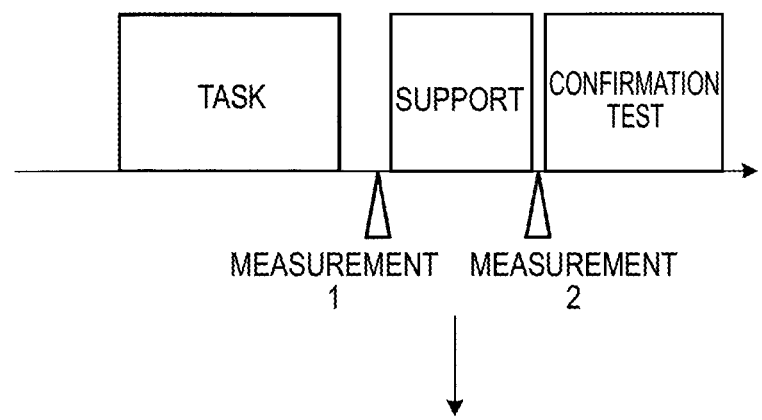
FIGS. 24A and 24B are diagrams showing a hyperarousal score and the like in the evaluation experiment of the embodiment.
Figure 24B:
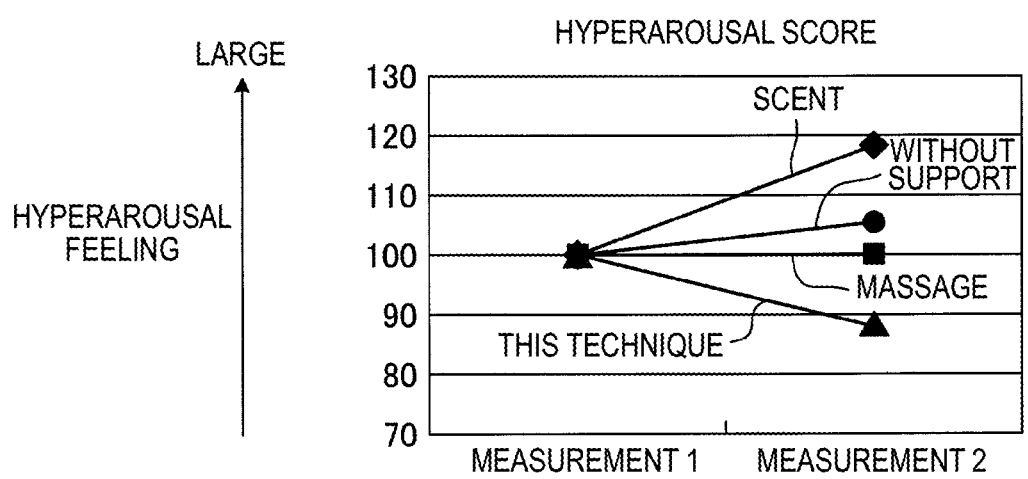

Here, FIGS. 24A and 24B are diagrams showing a hyperarousal score and the like in the evaluation experiment of the embodiment. In this evaluation experiment, a memory task (learns 20 types of words in 2 minutes) is performed, and a comparison is made in the magnitude of improvement in the hyperarousal score in cases of four types of this technique, scent, massage, and without support by performing the support before a memory confirmation test after the task is executed. Specifically, task, measurement 1, support, measurement 2, and confirmation test are performed in a time-series as shown in FIG. 24A.

The hyperarousal score has fallen most significantly in the case of this technique as shown in FIG. 24B. Only with this technique, the hyperarousal score is reduced even before the confirmation test (under mental stress load due to the task). The score at the time of measurement 2 is represented with the score at the time of measurement 1 as 100 in FIG. 24B.

Figure 25:
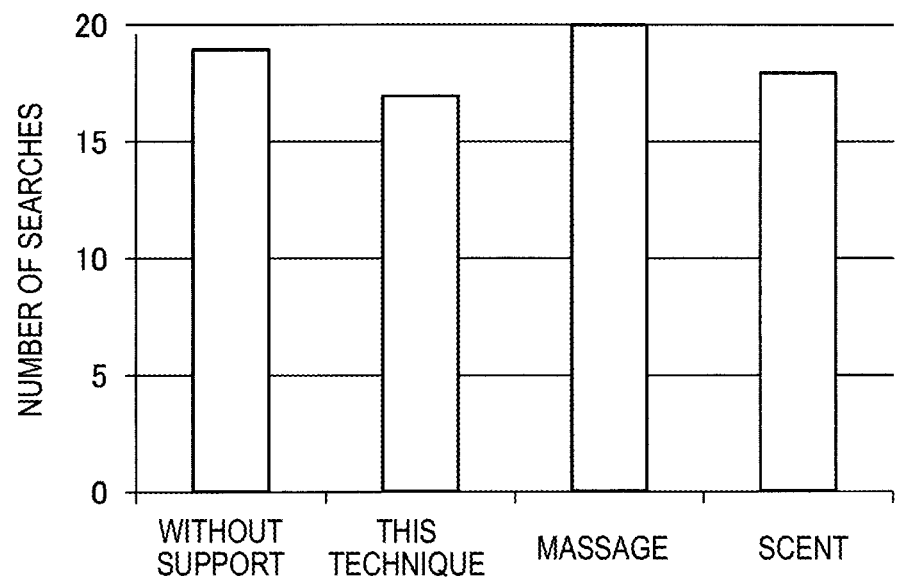
FIG. 25 is a diagram showing a result of a confirmation test in the evaluation experiment of the embodiment.

FIG. 25 is a diagram showing a result of the confirmation test in the evaluation experiment of the embodiment. The result of the confirmation test is the lowest in the case of this technique as shown in FIG. 25. It is considered that relaxation of concentration power on work of holding the memory (relaxation of hyperarousal state) due to relaxation of a concentration state (hyperarousal state) with respect to the task leads to a reduction in memory performance. Therefore, it can be considered that moderate calmness/coolness is recovered by the support of this technique.

In the description of this embodiment, the functions as the psychosomatic state adjustment support device are described as being realized by the ECU 21, that is, one computer. However, this disclosure is not limited thereto, and the functions as the psychosomatic state adjustment support device may be realized by being distributed to a plurality of computers.

In the above description, the functions as the psychosomatic state adjustment support device are described as being realized by the CPU 21a executing the psychosomatic state adjustment support program. However, this disclosure is not limited thereto, and some or all of the functions as the psychosomatic state adjustment support device may be realized by a hardware circuit such as an application specific integrated circuit (ASIC).

The functions as the psychosomatic state adjustment support device may be realized by any portable information terminal. For example, the driver downloads the psychosomatic state adjustment support program in advance to a smartphone. Then, the driver connects the smartphone to the in-vehicle network 26 and each vibration device 20 wirelessly or by wire to activate the psychosomatic state adjustment support program. The smartphone starts the functions as the psychosomatic state adjustment support device, and can acquire a scheduled operation of autonomous driving from the ECU 21 or control each vibration device 20 by transmitting a signal to each vibration device 20.

As described above, the functions as the psychosomatic state adjustment support device according to the embodiment can be realized by various types of hardware.

As mentioned above, the embodiments disclosed here are illustrated. However, the embodiments and modification examples are merely examples and are not intended to limit the scope of the disclosure. The above embodiments and modification examples can be implemented in various other forms, and various omissions, replacements, combinations, and changes can be made without departing from the concept of the disclosure. The configuration and shape of each embodiment or each modification example may be partially replaced.

For example, the moving body is not limited to the automobile, but may be a rail vehicle, an airplane, a ship, or the like. For example, when this disclosure is adapted to the airplane, so-called jet lag can be eliminated.

A psychosomatic state adjustment support device according to an aspect of this disclosure includes a storage section that stores a target psychosomatic state for each destination of a moving body, a specification section that specifies a current psychosomatic state of an occupant of the moving body, an acquisition section that acquires a destination of the moving body, a deciding section that decides a vibration pattern based on the target psychosomatic state according to the destination and the current psychosomatic state, and a control section that applies a vibration stimulation to the occupant by causing a vibration applying section provided in a seat on which the occupant is seated to vibrate based on the vibration pattern. With this configuration, it is possible to flexibly induce the psychosomatic state of the occupant to the target psychosomatic state according to the destination.

In the above psychosomatic state adjustment support device, for example, the storage section may store the target psychosomatic state for each destination of the moving body as two-dimensional information which is information in which each destination is disposed on a two-dimensional plane having two axes of a body state and a mental state. The psychosomatic state adjustment support device may further include a display control section that causes a display section to display a two-dimensional planar image having two axes of the body state and the mental state corresponding to the two-dimensional information as a screen for inputting the current psychosomatic state of the occupant. The specification section may specify a position indicating the current psychosomatic state of the occupant in the two-dimensional planar image in a case where the occupant designates the current psychosomatic state using the two-dimensional planar image displayed on the display section. The deciding section may decide the vibration pattern based on a difference between a position of the destination in the two-dimensional information and the position indicating the current psychosomatic state of the occupant in the two-dimensional planar image. With this configuration, it is possible to decide an appropriate vibration pattern only by the occupant inputting the current psychosomatic state on the two-dimensional planar image.

In the psychosomatic state adjustment support device, for example, the target psychosomatic state may be a positive mental state. The vibration pattern may be a pattern for inducing the kinesthetic illusion of a light exercise by repeating, for each first predetermined time, a first vibration pattern for applying a vibration at a first frequency that promotes muscle tone with respect to one skeletal muscle of a predetermined set of skeletal muscles used for light exercise and a vibration at a second frequency that suppresses the muscle tone with respect to the other skeletal muscle of the predetermined set of skeletal muscles, and a second vibration pattern for applying the vibration at the second frequency with respect to the one skeletal muscle and the vibration at the first frequency with respect to the other skeletal muscle. With this configuration, it is possible to induce the occupant to the positive mental state by the above vibration pattern.

In the psychosomatic state adjustment support device, for example, the target psychosomatic state may be a positive mental state. The vibration pattern may be a pattern for inducing breathing to inhale deeply by repeating, for each second predetermined time, a third vibration pattern for applying a vibration at a first frequency that promotes muscle tone with respect to a skeletal muscle stretched during inspiration, and a vibration stop pattern for applying no vibration with respect to the skeletal muscle. With this configuration, it is possible to induce the occupant to the positive mental state by the above vibration pattern.

In the psychosomatic state adjustment support device, for example, the target psychosomatic state may be a relaxed mental state. The vibration pattern may be a pattern for inducing a rubbing illusion by repeating, for each third predetermined time, a fourth vibration pattern for applying a vibration at a first frequency that promotes muscle tone with respect to one skeletal muscle of a predetermined set of skeletal muscles used for rubbing perception and a vibration at a second frequency that suppresses the muscle tone with respect to the other skeletal muscle of the predetermined set of skeletal muscles, and a fifth vibration pattern for applying the vibration at the second frequency with respect to the one skeletal muscle and the vibration at the first frequency with respect to the other skeletal muscle. With this configuration, it is possible to induce the occupant to the relaxed mental state by the above vibration pattern.

In the psychosomatic state adjustment support device, for example, the target psychosomatic state may be a relaxed mental state. The vibration pattern may be a pattern for inducing breathing to exhale deeply by performing, for a fourth predetermined time, a sixth vibration pattern for applying a vibration at a first frequency that promotes muscle tone with respect to a skeletal muscle stretched during inspiration. With this configuration, it is possible to induce the occupant to the relaxed mental state by the above vibration pattern.

In the psychosomatic state adjustment support device, for example, the target psychosomatic state may be a nimble body state. The vibration pattern may be a pattern for creating a preparation state that improves a neural connection between the brain and each of a plurality of predetermined skeletal muscles and controls the skeletal muscles, by sequentially applying a vibration at a first frequency that promotes muscle tone to each of the plurality of skeletal muscles used for posture control, for each fifth predetermined time. With this configuration, it is possible to induce the occupant to the nimble body state by the above vibration pattern.

A psychosomatic state adjustment support method according to another aspect of this disclosure is a psychosomatic state adjustment support method by a psychosomatic state adjustment support device including a storage section that stores a target psychosomatic state for each destination of a moving body. The method includes a specification step of specifying a current psychosomatic state of an occupant of the moving body, an acquisition step of acquiring a destination of the moving body, a deciding step of deciding a vibration pattern based on the target psychosomatic state according to the destination and the current psychosomatic state, and a control step of applying a vibration stimulation to the occupant by causing a vibration applying section provided in a seat on which the occupant is seated to vibrate based on the vibration pattern. With this configuration, it is possible to obtain the same effect as the above psychosomatic state adjustment support device.

A computer-readable medium storing a psychosomatic state adjustment support program according to another aspect of this disclosure causes a computer including a storage section that stores a target psychosomatic state for each destination of a moving body to execute a specification step of specifying a current psychosomatic state of an occupant of the moving body, an acquisition step of acquiring a destination of the moving body, a deciding step of deciding a vibration pattern based on the target psychosomatic state according to the destination and the current psychosomatic state, and a control step of applying a vibration stimulation to the occupant by causing a vibration applying section provided in a seat on which the occupant is seated to vibrate based on the vibration pattern. With this configuration, it is possible to obtain the same effect as the above psychosomatic state adjustment support device.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A psychosomatic state adjustment support device comprising:
    a memory that is configured to store a target psychosomatic state for each of a plurality of destinations of a moving body; and
    at least one processor configured to implement:
        a specification section that is configured to specify a current psychosomatic state of an occupant of the moving body;
        an acquisition section that is configured to acquire a destination of the moving body;
        a deciding section that is configured to decide a vibration pattern based on the target psychosomatic state according to the destination and the current psychosomatic state; and
    a control section that is configured to apply a vibration stimulation to the occupant by causing a vibration applying section provided in a seat on which the occupant is seated to vibrate based on the vibration pattern, wherein
    the memory is configured to store the target psychosomatic state for each of the plurality destinations of the moving body as two-dimensional information which is information in which each destination is disposed on a two-dimensional plane having two axes of a body state and a mental state,
    the psychosomatic state adjustment support device further comprising:
        a display control section that is configured to cause a display section to display a two-dimensional planar image having two axes of the body state and the mental state corresponding to the two-dimensional information as a screen for inputting the current psychosomatic state of the occupant,
        the specification section is configured to specify a position indicating the current psychosomatic state of the occupant in the two-dimensional planar image in a case where the occupant designates the current psychosomatic state using the two-dimensional planar image displayed on the display section, and
        the deciding section is configured to decide the vibration pattern based on a difference between a position of the destination in the two-dimensional information and the position indicating the current psychosomatic state of the occupant in the two- dimensional planar image.

2. The psychosomatic state adjustment support device according to claim 1, wherein
    the target psychosomatic state is a positive mental state, and
    the vibration pattern is a pattern for inducing a kinesthetic illusion of a light exercise by repeating, for a predetermined time,
        a first vibration pattern for applying a vibration at a first frequency that promotes muscle tone with respect to one skeletal muscle of a predetermined set of skeletal muscles used for light exercise and a vibration at a second frequency that suppresses the muscle tone with respect to the other skeletal muscle of the predetermined set of skeletal muscles, and
        a second vibration pattern for applying the vibration at the second frequency with respect to the one skeletal muscle and the vibration at the first frequency with respect to the other skeletal muscle.

3. The psychosomatic state adjustment support device according to claim 1, wherein
the target psychosomatic state is a positive mental state, and
the vibration pattern is a pattern for inducing breathing to inhale deeply by repeating, for a predetermined time,
a first vibration pattern for applying a vibration at a first frequency that promotes muscle tone with respect to a skeletal muscle stretched during inspiration, and
a vibration stop pattern for applying no vibration with respect to the skeletal muscle.

4. The psychosomatic state adjustment support device according to claim 1, wherein
the target psychosomatic state is a relaxed mental state, and
the vibration pattern is a pattern for inducing a rubbing illusion by repeating, for a predetermined time,
a first vibration pattern for applying a vibration at a first frequency that promotes muscle tone with respect to one skeletal muscle of a predetermined set of skeletal muscles used for rubbing perception and a vibration at a second frequency that suppresses the muscle tone with respect to the other skeletal muscle of the predetermined set of skeletal muscles, and
a second vibration pattern for applying the vibration at the second frequency with respect to the one skeletal muscle and the vibration at the first frequency with respect to the other skeletal muscle.

5. The psychosomatic state adjustment support device according to claim 1, wherein
the target psychosomatic state is a relaxed mental state, and
the vibration pattern is a pattern for inducing breathing to exhale deeply by performing, for a predetermined time, a second vibration pattern for applying a vibration at a first frequency that promotes muscle tone with respect to a skeletal muscle stretched during inspiration.

6. The psychosomatic state adjustment support device according to claim 1, wherein
the target psychosomatic state is a nimble body state, and
the vibration pattern is a pattern for creating a preparation state that improves a neural connection between the brain and each of a plurality of predetermined skeletal muscles and controls the skeletal muscles, by sequentially applying a vibration at a first frequency that promotes muscle tone to each of the plurality of skeletal muscles used for posture control, each for a predetermined time.

7. A psychosomatic state adjustment support method by a psychosomatic state adjustment support device including a storage section that stores a target psychosomatic state for each of a plurality of destinations of a moving body, comprising:
a specification step of specifying a current psychosomatic state of an occupant of the moving body;
an acquisition step of acquiring a destination of the moving body;
a deciding step of deciding a vibration pattern based on the target psychosomatic state according to the destination and the current psychosomatic state;
a control step of applying a vibration stimulation to the occupant by causing a vibration applying section provided in a seat on which the occupant is seated to vibrate based on the vibration pattern;
a storing step of storing the target psychosomatic state for each of the plurality destinations of the moving body as two-dimensional information which is information in which each destination is disposed on a two-dimensional plane having two axes of a body state and a mental state; and
a display step of displaying a two-dimensional planar image having two axes of the body state and the mental state corresponding to the two-dimensional information as a screen for inputting the current psychosomatic state of the occupant,
wherein the specification step specifies a position indicating the current psychosomatic state of the occupant in the two-dimensional planar image in a case where the occupant designates the current psychosomatic state using the two-dimensional planar image displayed in the display step, and
the deciding step decides the vibration pattern based on a difference between a position of the destination in the two-dimensional information and the position indicating the current psychosomatic state of the occupant in the two-dimensional planar image.

8. A computer-readable medium comprising a memory storing a psychosomatic state adjustment support program configured to cause a computer including a storage section that stores a target psychosomatic state for each of a plurality of destinations of a moving body to execute steps comprising:
a specification step of specifying a current psychosomatic state of an occupant of the moving body;
an acquisition step of acquiring a destination of the moving body;
a deciding step of deciding a vibration pattern based on the target psychosomatic state according to the destination and the current psychosomatic state;
a control step of applying a vibration stimulation to the occupant by causing a vibration applying section provided in a seat on which the occupant is seated to vibrate based on the vibration pattern;
a storing step of storing the target psychosomatic state for each of the plurality destinations of the moving body as two-dimensional information which is information in which each destination is disposed on a two-dimensional plane having two axes of a body state and a mental state; and
a display step of displaying a two-dimensional planar image having two axes of the body state and the mental state corresponding to the two-dimensional information as a screen for inputting the current psychosomatic state of the occupant,
wherein the specification step specifies a position indicating the current psychosomatic state of the occupant in the two-dimensional planar image in a case where the occupant designates the current psychosomatic state using the two-dimensional planar image displayed in the display step, and
the deciding step decides the vibration pattern based on a difference between a position of the destination in the two-dimensional information and the position indicating the current psychosomatic state of the occupant in the two-dimensional planar image.

* * * * *